United States Patent
Murakami et al.

(10) Patent No.: US 9,826,509 B2
(45) Date of Patent: Nov. 21, 2017

(54) RELAY DEVICE AND SESSION CONTROL METHOD

(71) Applicant: FUJITSU LIMITED, Kawasaki-shi, Kanagawa (JP)

(72) Inventors: Yuya Murakami, Kanagawa (JP); Yuki Shinada, Warabi (JP); Kazunari Kobayashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 14/852,142

(22) Filed: Sep. 11, 2015

(65) Prior Publication Data
US 2016/0100454 A1    Apr. 7, 2016

(30) Foreign Application Priority Data

Oct. 6, 2014 (JP) ................................. 2014-205559

(51) Int. Cl.
*H04W 76/06* (2009.01)
*H04W 72/04* (2009.01)
(Continued)

(52) U.S. Cl.
CPC ........ *H04W 72/04* (2013.01); *H04B 7/15528* (2013.01); *H04W 28/06* (2013.01);
(Continued)

(58) Field of Classification Search
CPC ... H04W 72/04; H04W 28/06; H04W 76/066; H04W 88/182; H04W 80/06; H04W 84/047; H04B 7/15528
See application file for complete search history.

(56) References Cited

U.S. PATENT DOCUMENTS

2001/0053133 A1    12/2001  Horikawa
2003/0218996 A1*   11/2003  Sumino .................. H04L 45/28
                                                    370/328
(Continued)

FOREIGN PATENT DOCUMENTS

JP    2001-358760 A    12/2001
JP    2003-110622 A     4/2003

OTHER PUBLICATIONS

"Transmission Control Protocol," Information Sciences Institute University of Southern California, RFC: 793, Sep. 1981, pp. 1-90.
(Continued)

*Primary Examiner* — Mohammad Adhami
*Assistant Examiner* — Shailendra Kumar
(74) *Attorney, Agent, or Firm* — Arent Fox LLP

(57) ABSTRACT

The relay device is configured to relay packet data between an information processing device and a mobile equipment, and the relay device includes a memory, and a processor coupled to the memory and configured to receive, from the information processing device, a session release request that requests release of a communication session set between the mobile equipment and the information processing device, and when there is not a wireless resource allocated to the mobile equipment, transmit a session release response to the session release request to the information processing device without transmitting the session release request to the mobile equipment.

18 Claims, 16 Drawing Sheets

(51) Int. Cl.
*H04B 7/155* (2006.01)
*H04W 28/06* (2009.01)
H04W 84/04 (2009.01)
H04W 80/06 (2009.01)
H04W 88/18 (2009.01)

(52) U.S. Cl.
CPC .......... *H04W 76/066* (2013.01); *H04W 80/06* (2013.01); *H04W 84/047* (2013.01); *H04W 88/182* (2013.01)

(56) References Cited

U.S. PATENT DOCUMENTS

| | | | |
|---|---|---|---|
| 2005/0063304 A1* | 3/2005 | Sillasto | H04W 76/068 370/229 |
| 2008/0310397 A1* | 12/2008 | Hu | H04Q 3/0045 370/352 |
| 2011/0238807 A1* | 9/2011 | Lee | H04W 8/24 709/223 |
| 2012/0166617 A1* | 6/2012 | Chang | H04W 76/02 709/224 |
| 2015/0250005 A1* | 9/2015 | Chang | H04W 4/10 455/518 |

OTHER PUBLICATIONS

3 GPP TS 25.331 V12.2.0 (Jun. 2014), 3$^{rd}$ Generation Partnership Project; Technical Specification Group Radio Access Network; Radio Resource Control (RRC); Protocol specification (Release 12); pp. 1-2,140.

* cited by examiner

RELAY DEVICE AND SESSION CONTROL METHOD

CROSS-REFERENCE TO RELATED APPLICATION

This application is based upon and claims the benefit of priority of the prior Japanese Patent Application No. 2014-205559, filed on Oct. 6, 2014, the entire contents of which are incorporated herein by reference.

FIELD

The embodiments discussed herein are related to a relay device and a session control method.

BACKGROUND

Currently, mobile phone systems, and communication systems, such as a wireless local area network (WLAN), and the like, are widely used. In the field of wireless communication, in order to further increase a communication speed and a communication capacity, there are continued discussions about next-generation communication technology. For example, The 3rd Generation Partnership Project (3GPP), which is a standards body, has completed or examined the standardization of a communication specification called Long Term Evolution (LTE) and a communication specification called LTE-Advanced (LTE-A) based on LTE.

In such a communication system, a wireless base station allocates a wireless resource, generates a control signal including an allocation result, and transmits the control signal to a mobile equipment. Wireless resource allocation includes specific frequency allocation or specific time allocation. The mobile equipment performs wireless communication with the wireless base station in accordance with a wireless resource included in a control signal, and the wireless base station also performs wireless communication with the mobile equipment in accordance with the allocated wireless resource.

The wireless resources are limited and, in order to increase use efficiency thereof, the wireless base station minimizes wireless resource allocation to a mobile equipment in a non-communication state in one hand, and allocates a wireless resource to a mobile equipment in a communication state on the other hand. Therefore, when a non-communication state continues for a certain time, the wireless base station releases a wireless resource allocated to the mobile equipment. In this case, a timer that measures a non-communication state and triggers release of a wireless resource will be referred to as, for example, a wireless resource release timer, occasionally.

However, there are cases where a control signal is generated between the wireless base station and the mobile equipment and furthermore between the wireless base station and a higher-level device by release of a wireless resource and reallocation of a wireless resource thereafter, and the control signal is exchanged. There are also cases where, when release and reallocation of a wireless resource is frequently repeated, the generation and exchange of a control signal increases to impose a large processing burden on each device in the communication system.

There are also cases where, for example, the mobile equipment and the higher-level device set a transmission control protocol (TCP) session and exchange a data stream and the like, based on the TCP session. In such a case, when a non-communication state continues, the TCP session is released in a higher-level device, or the like. Due to release of a TCP session, the occupancy of network resource of the TCP session does not occur, and congestion of data streams is not caused. In this case, a timer that triggers release of a set TCP session will be referred to as, for example, a TCP session release timer, occasionally.

There are cases where, due to a difference between two times, that is, an expiration time when the wireless resource release timer expires and an expiration time when the TCP session release timer expires, for example, the following two states occur. FIG. 16A and FIG. 16B are diagrams illustrating examples of the states.

A first example is a state where, as illustrated in FIG. 16A, the TCP session release timer has not expired at the time when the wireless resource release timer expired.

In this case, for example, the wireless base station releases a wireless resource in accordance with an expiration of the wireless resource release timer (S200). Thereafter, in accordance with an expiration of the TCP session release timer, the wireless base station receives a TCP session release request from the higher-level device (S201). Next, the wireless base station resets the released wireless resource (S202). Then, the wireless base station transmits a TCP session release request to a mobile equipment using the reset wireless resource (S203).

A second example is a state where, as illustrated in FIG. 16B, the wireless resource release timer has not expired at the time when the TCP session release timer expired.

In this case, for example, the wireless base station transmits the TCP session release request, which has been received from the higher-level device to a mobile equipment, using a set wireless resource (S210). At this transmission of the TCP session release request, in the wireless base station, the wireless resource release timer is reset in accordance with transmission of the TCP session release request (S211). Thereafter, when the wireless resource release timer expires, the wireless base station releases the wireless resource (S212).

As related techniques for communication, for example, there are the following techniques.

That is, there is a technique in which, in the case where hypertext transfer protocol (HTTP) communication between a mobile telephone and a content server is relayed, when a gateway server receives a release report signal indicating that a wireless link or a wire link is disconnected, the gateway server immediately releases a TCP connection with the mobile phone.

Using this technique, a connection type communication may be controlled so that increase in traffic of a network is reduced and a useless occupancy of a network resource does not occur.

There is another technique in which, when a moving body exchanger identifies an IP address, FIN, and ACK from one terminal side to detect data transfer and identifies an IP address and ACK from the other terminal side to detect data transfer, the moving body exchanger releases a communication channel corresponding to a mobile equipment number thereof after IP address exchange.

Using this technique, effective use of wireless frequency bands may be allowed, a statistically multiplexing effect may be increased, and also increases of the signal processing scale and the device scale may be reduced. As related art non-patent documents, there are 3GPP TS 25.331 V12.2.0 (2014-06) and RFC793. Japanese Laid-open Patent Publication No. 2001-358760 and Japanese Laid-open Patent Publication No. 2003-110622 are patent related art patent documents.

SUMMARY

According to an aspect of the invention, a relay device is configured to relay packet data between an information processing device and a mobile equipment, and the relay device includes a memory, and a processor coupled to the memory and configured to receive, from the information processing device, a session release request that requests release of a communication session set between the mobile equipment and the information processing device, and when there is not a wireless resource allocated to the mobile equipment, transmit a session release response to the session release request to the information processing device without transmitting the session release request to the mobile equipment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 16A:
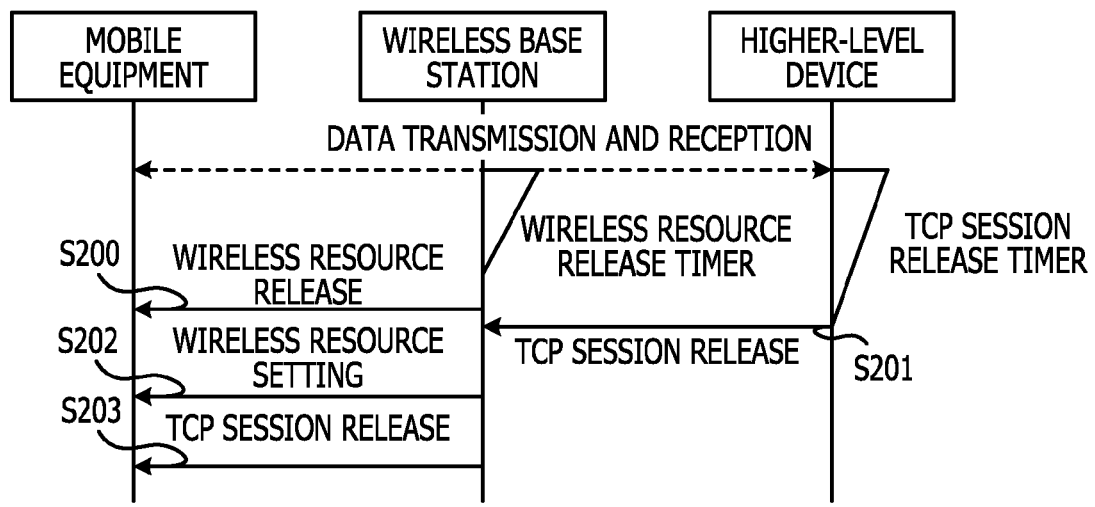
FIGS. 16A and 16B are diagrams each illustrating an example in which expiration times of a wireless resource release timer and a TCP session release timer different from each other.
Figure 16B:
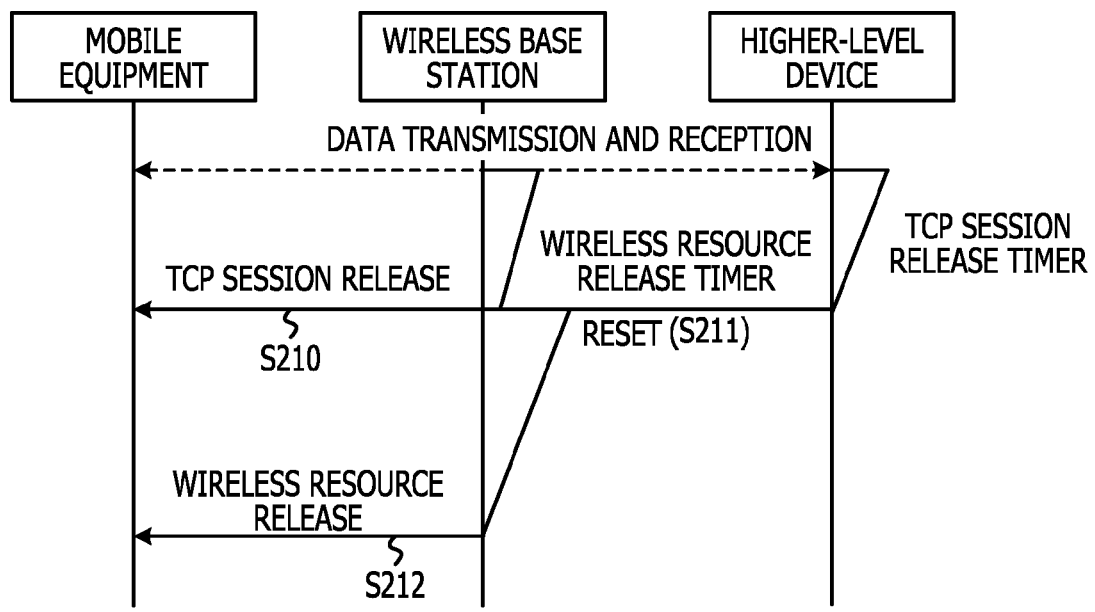

In the examples illustrated in FIG. 16A and FIG. 16B, the following problem arises. Specifically, as illustrated in FIG. 16A, if the TCP session release timer has not expired at the time when the wireless resource release timer expired, the wireless base station resets the wireless resource only for transmitting a TCP session release request to the mobile equipment (S202). Thus, resetting of a wireless resource is performed on a wireless resource that is not involved in transmission and reception of data. There are cases where a useless control signal is generated due to resetting of a wireless resource that is not involved in transmission and reception of data. For example, there are cases where, due to the generation of a useless control signal, a processing load is compressed in the mobile equipment and the wireless base station.

As illustrated in FIG. 16B, if the wireless resource release timer has not expired at the time when the TCP session release timer expired, a TCP session does not exist between resetting (S211) and wireless resource release (S211). Although a TCP session does not exist between the mobile equipment and the wireless base station and a non-communication state occurred therebetween, a state where a wireless resource is not released holds. Due to the occurrence of such a state, a state where a useless wireless resource that is not involved in transmission and reception of data is still allocated occurs, and thus, the use efficiency of wireless resources is reduced.

In the technique in which, when a release report signal is received, a TCP connection with a mobile phone is immediately released and the technique in which a communication channel corresponding to a mobile equipment number after IP address exchange is released, no consideration is paid to two timers, that is, the wireless resource release timer and the TCP session release timer. Therefore, in the two techniques, there are cases where a useless control signal occurs, and also, there are cases where the use efficiency of wireless resources is reduced. Embodiments of the present disclosure will be described below.

First Embodiment

Figure 1:
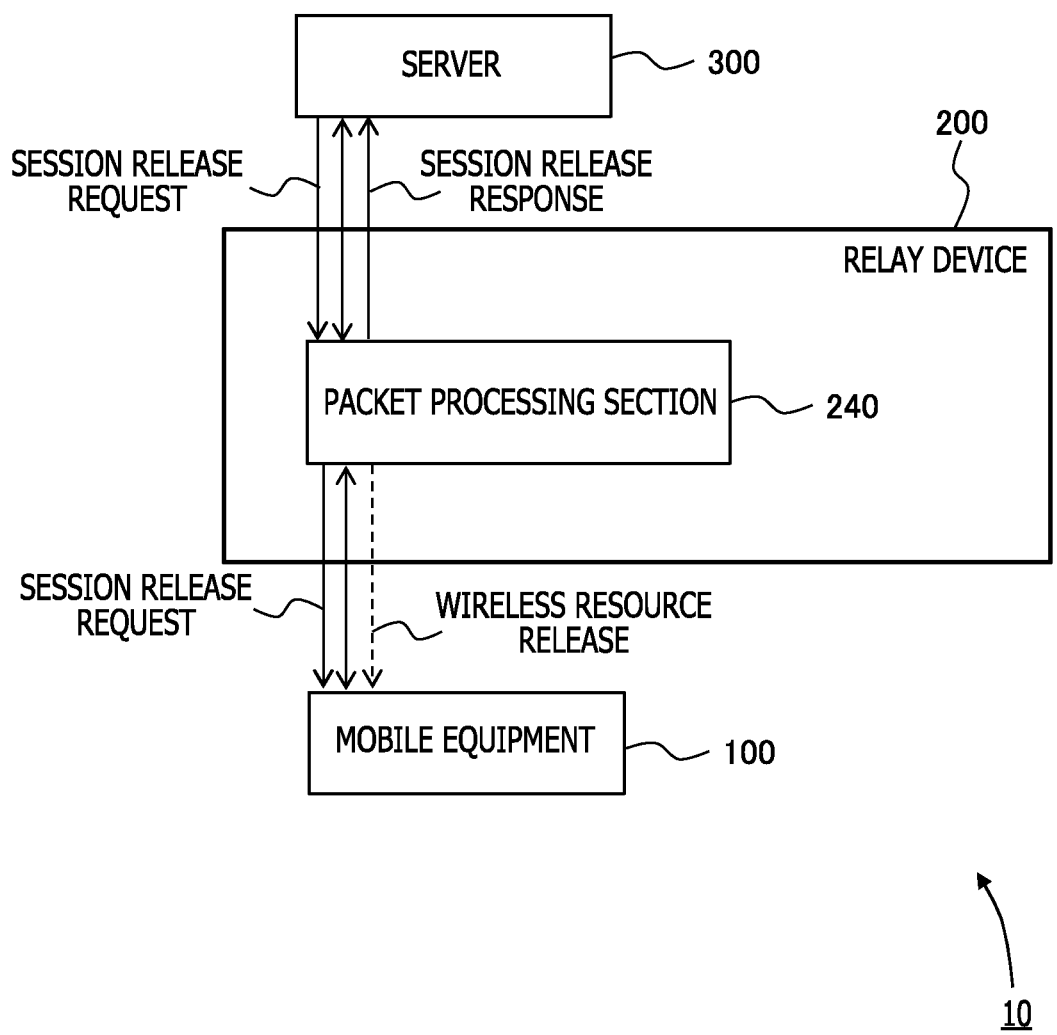
FIG. 1 is a diagram illustrating a configuration example of a communication system.

FIG. 1 is a diagram illustrating configuration examples of a communication system 10 and a relay device 200.

The communication system 10 includes a mobile equipment 100, a relay device 200, and a server 300 (for example, an application server).

The mobile equipment 100 is, for example, a terminal device, such as a smart phone, a feature phone, and the like. The server 300 is, for example, a Web server, or the like. The mobile equipment 100 and the server 300 set communication session and transmit and receive packet data, based on the set communication session.

The relay device 200 is coupled between the mobile equipment 100 and the server 300 and relays the packet data. The relay device 200 includes a packet processing section 240.

The packet processing section 240 monitors a session release request that is transmitted from the server 300 and requests release of a communication session. When the packet processing section 240 receives a session release request, the packet processing section 240 transmits a session release response to the session release request to the server 300 without transmitting the session release request to the mobile equipment 100, based on whether or not there is a wireless resource allocated to the mobile equipment 100.

For example, if there is not a wireless resource for the mobile equipment 100 at the time of reception of the session release request, the packet processing section 240 transmits a session release response to the server 300 without reallocating or resetting a wireless resource for the mobile equipment 100.

Thus, for example, when the relay device 200 receives the session release request, the relay device 200 does not reset a wireless resource only for transmitting the session release request to the mobile equipment 100. Therefore, due to resetting of a wireless resource, in the relay device 200 and the mobile equipment 100, a control signal is not newly generated, and exchange of a control signal does not take place. Accordingly, a useless control signal may be reduced by the relay device 200.

Note that, as for a session release request received from the server 300, when the relay device 200 newly sets a wireless resource between the server 300 and the mobile equipment 100 at another opportunity, the relay device 200 may transmit the request to the mobile equipment 100.

The packet processing section 240 transmits the session release request to the mobile equipment 100, based on a monitoring result of the session release request and whether or not there is a wireless resource allocated to the mobile equipment 100, and releases a wireless resource allocated to the mobile equipment 100.

For example, if there is a wireless resource at the time of reception of the session release request, the packet processing section 240 transmits the session release request to the mobile equipment 100, and releases the wireless release allocated to the mobile equipment 100. In this case, the packet processing section 240 releases the wireless resource before a wireless resource release timer that counts a time for which the wireless resource is released expires.

Thus, for example, even when a non-communication state occurs due to the session release request, the relay device 200 immediately releases the wireless resource, so that a state where a wireless resource is set even in a non-communication state does not occur. Therefore, the use efficiency of wireless resources may be increased by the relay device 200.

Second Embodiment

<Configuration Example of Communication System>

Figure 2:
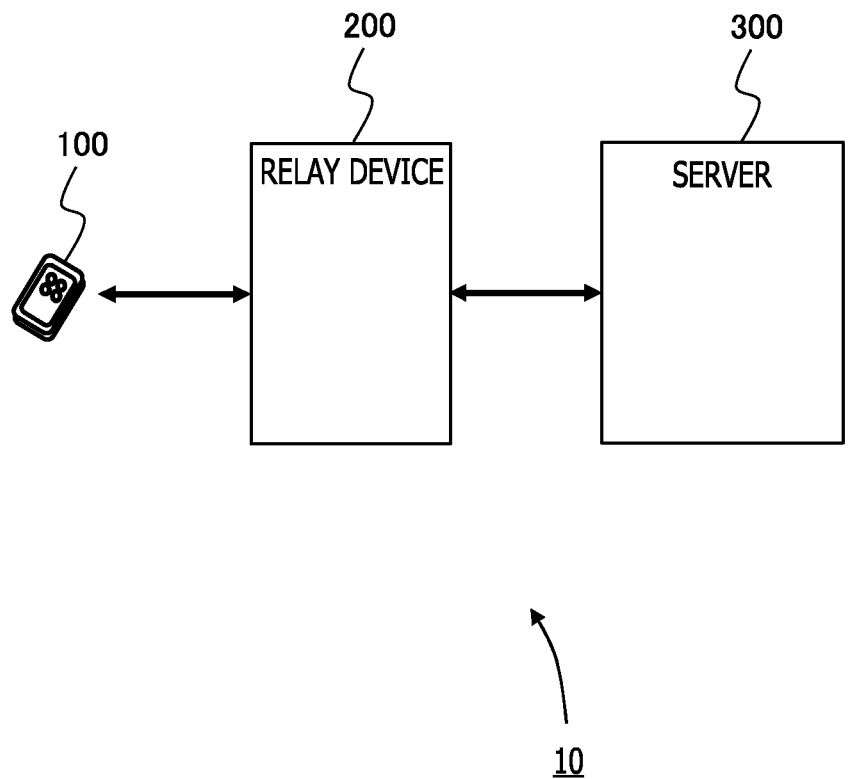
FIG. 2 is a diagram illustrating a configuration example of a communication system.

First, a configuration example of a communication system will be described. FIG. 2 is a diagram illustrating a configuration example of the communication system 10. The communication system 10 includes a mobile equipment 100, a relay device 200, and a server 300.

The mobile equipment 100 is, for example, a smart phone, a feature phone, a personal computer, a tablet, or the like. The mobile equipment 100 performs wireless communication with a base station in a communicable range (or a cell range) of a wireless base station device (which will be occasionally hereinafter referred to as a "base station"). Thus, for example, the mobile equipment 100 may receive various services, such as a call service, a Web page browsing service, and the like.

The relay device 200 is, for example, a base station. The relay device 200 may be a higher-level device coupled to a base station via a wire. As for examples of the higher-level device, when the communication system 10 is a 3G system, the higher-level device is a Radio Network Controller (RNC), and when the communication system 10 is an LTE system, the higher-level device is a mobility management entity (MME), a serving-gateway (S-GW), or the like. In the following description, a base station is described as an example of the relay device 200.

The relay device 200 manages a Transmission Control Protocol (TCP) session and a wireless resource. The relay device 200 relays user data, a control signal, and the like, transmitted from the server 300, and transmits them to the mobile equipment 100, using the TCP session and the wireless resource. The relay device 200 also transmits user data, a control signal, and the like, transmitted from the mobile equipment 100, to the server 300, using the TCP session and the wireless resource.

The TCP session is, for example, a session from a start of communication using a connection in accordance with a TCP to an end thereof. The server 300 and the mobile equipment 100 establish a TCP session, for example, by exchanging a control signal (or a message) regarding the TCP. Then, the server 300 and the mobile equipment 100 exchange user data and the like, based on the TCP session. The server 300 and the mobile equipment 100 also release (or disconnect) the TCP session, for example, by exchanging a control signal regarding the TCP.

Exchanging of a control signal or a message and thus setting of a session or a connection in the above-described manner will be occasionally referred to as, for example, a connection-type communication protocol. In the connection-type communication protocol, for example, a device at a reception side transmits a response signal, such as an ACK signal and the like, for transmitted user data, and therefore, a device at a transmission side is enabled to confirm that the user data or the like was received by the device at the reception side.

In accordance with a communication protocol, such as a User Datagram Protocol (UDP) and the like, user data and the like are unilaterally transmitted and a device at a reception side does not transmit a response signal or the like. Such a communication protocol will be occasionally referred to as, for example, a connectionless-type communication protocol.

In the second embodiment, a TCP, which is a connection-type communication protocol, will be described as an example. In the second embodiment, a protocol, such as a Datagram Congestion Control Protocol (DCCP), connection-type Ethernet, Asynchronous Transfer Mode (ATM), a Transparent Inter-process Communication (TIPC), and the like, other than a TCP, may be used as long as the protocol is a connection-type protocol.

Also, packet data is exchanged between the mobile equipment 100 and the server 300. As packet data, for example, TCP packet data (which will be hereinafter referred to as a "TCP packet" occasionally) in accordance with a TCP protocol is employed.

When the relay device 200 performs communication with the mobile equipment 100, the relay device 200 allocates a wireless resource (a frequency and/or a time) to the mobile equipment 100. The relay device 200 generates a control signal including a result of scheduling and transmits the generated control signal to the mobile equipment 100. The mobile equipment 100 performs communication with the relay device 200 using a wireless resource included in the control signal. Also, the relay device 200 performs communication with the mobile equipment 100 using the wireless resource scheduled by the relay device 200 itself. Such communication using a wireless resource enables the relay device 200 to exchange packet data, such as a TCP packet and the like, with the mobile equipment 100.

The server 300 is, for example, a server device, such as a Web server and the like. The server 300 exchanges packet data, such as a TCP packet and the like, with the mobile equipment 100 via the relay device 200.

<Configuration Example of Each Device>

Figure 3:
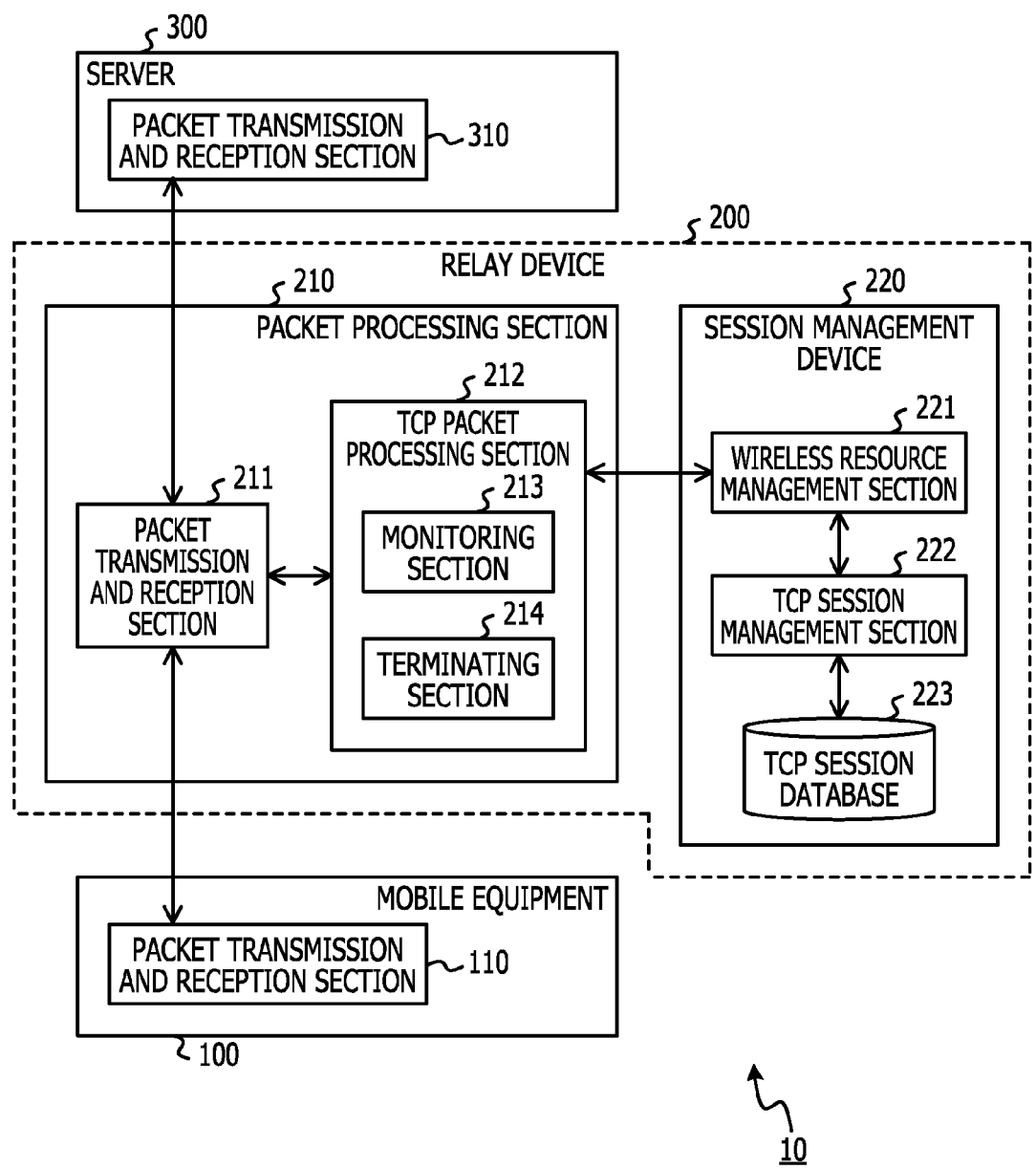
FIG. 3 is a diagram illustrating a configuration example of a communication system.

Next, each of configuration examples of the mobile equipment 100, the relay device 200, and the server 300 will be described. FIG. 3 is a diagram illustrating each of configuration examples of the mobile equipment 100, the relay device 200, and the server 300.

The mobile equipment 100 includes a packet transmission and reception section 110. The packet transmission and reception section 110 receives packet data transmitted from the relay device 200 and transmits packet data generated in the mobile equipment 100 to the relay device 200.

The server 300 includes a packet transmission and reception section 310. The packet transmission and reception section 310 receives packet data transmitted from the relay device 200 and transmits packet data generated in the server 300 to the relay device 200.

The relay device 200 relays packet data that is exchanged between the mobile equipment 100 and the server 300. The relay device 200 includes a packet processing device (or a packet processing section) 210 and a session management device (or a session management section) 220.

Note that the packet processing section 210 corresponds to, for example, the packet processing section 240 in the first embodiment.

The packet processing section 210 includes a packet transmission and reception section 211 and a TCP packet processing section 212.

The packet transmission and reception section 211 transmits packet data transmitted from the packet transmission and reception section 110 of the mobile equipment 100 to the packet transmission and reception section 310 of the server 300. Also, the packet transmission and reception section 211 transmits packet data transmitted from the packet transmission and reception section 310 of the server 300 to the packet transmission and reception section 110 of the mobile equipment 100.

The TCP packet processing section 212 performs processing for a TCP packet. The TCP packet processing section 212 includes a monitoring section 213 and a terminating section 214. The monitoring section 213 monitors packet data transmitted and received in the packet transmission and reception section 211. For example, the monitoring section 213 monitors a TCP packet. The terminating section 214 terminates a predetermined TCP packet, among TCP packets, based on a monitoring result in the monitoring section 213. Details of processing performed in the TCP packet processing section 212 will be described in an operation example.

The session management device 220 performs processing, such as processing regarding a TCP session and a wireless resource for a TCP packet processed by the TCP packet processing section 212. The session management device 220 includes a wireless resource management section 221, a TCP session management section 222, and a TCP session database (DB) (or a communication session DB) 223.

The wireless resource management section 221 manages a wireless resource for each mobile equipment 100. For example, the wireless resource management section 221 allocates a wireless resource for each mobile equipment 100 and manages whether or not a wireless resource is allocated for each mobile equipment 100. The wireless resource management section 221 may hold information indicating whether or not a wireless resource is allocated for each mobile equipment 100 in an internal memory or the like.

The TCP session management section 222 manages a TCP session for each mobile equipment 100. The TCP session management section 222 manages a TCP session, based on, for example, an identification number (which will be hereinafter referred to be a mobile equipment number or a mobile equipment identification (ID) occasionally) used for distinguishing the mobile equipment 100 from another mobile equipment, and an identification number, that is, for example, a TCP port number, used for distinguishing the server 300 from another server. The TCP session management section 222 stores information regarding a TCP session in the TCP session DB 223.

Figure 4:
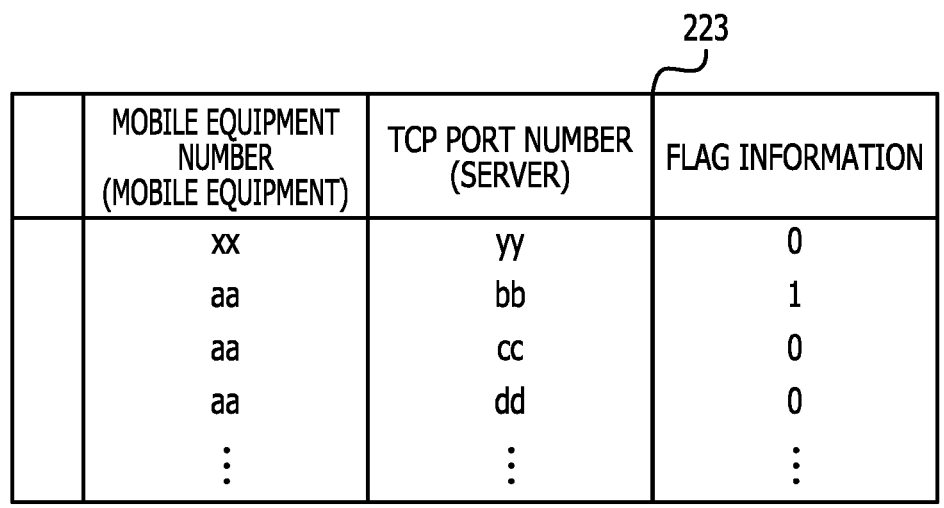
FIG. 4 is a table illustrating an example of a TCP session DB.

The TCP session DB 223 is a database or a memory that stores information regarding a TCP session, and stores the mobile equipment number, the TCP port number, and the like, for which a TCP session is set. FIG. 4 is a table illustrating an example of the TCP session DB 223. In the example of FIG. 4, a TCP session is set between the mobile equipment 100 having a mobile equipment number "xx" and the server 300 having a TCP port number "yy". Also, in the example of FIG. 4, three servers and a TCP session are set for a mobile equipment number "aa". Details of the TCP session DB 223 will be described later.

Note that, as described above, a timer configured to measure a non-communication state and triggers wireless resource release and counts a time in which a wireless resource is released will be referred to as, for example, a wireless resource release timer occasionally. Also, a timer configured to trigger a TCP session release and count a time for which a TCP session is released will be referred to as, for example, a TCP session release timer occasionally. For example, the wireless resource release timer is provided in the wireless resource management section 221 of the relay device 200, and the TCP session release timer is provided in the server 300.

<Operation Example>

Next, an operation example in the communication system 10 will be described. First, an entire operation example in the communication system 10 will be described with reference to FIG. 5 to FIG. 7. Next, an example of each operation will be described with reference to FIG. 8 to FIG. 14.

<Entire Operation Example>

There are, for example, two operation examples of the entire operation. A first operation example is an entire operation example where a wireless resource is not set. That is, the first operation example is an operation example where, after the wireless resource release timer expires (or times out) and a wireless resource is released, the TCP session release timer expires, and then, the relay device 200 receives a TCP session release request or a session release request.

A second operation example is an entire operation example where a wireless resource is set and there is not any other TCP session. That is, the second operation example is an operation example where the TCP release timer expire in a state where a wireless resource is set and the relay device 200 receives a TCP session release request. The two operation examples will be separately described below.

<1. Entire Open Example where Wireless Resource is not Set>

Figure 5:
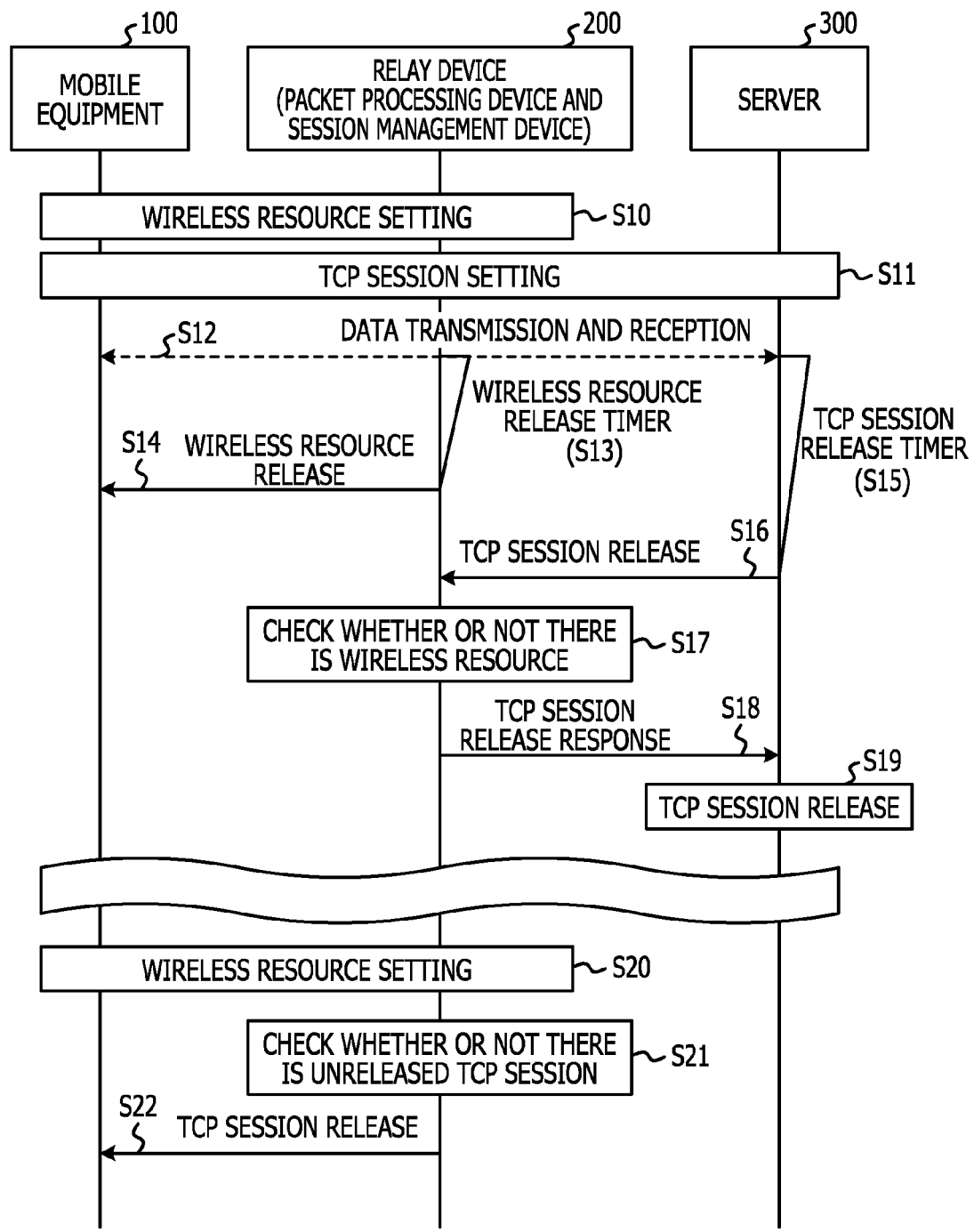
FIG. 5 is a sequence diagram illustrating an entire operation example.

FIG. 5 is a diagram illustrating an entire operation example where a wireless resource is not set. As illustrated in FIG. 5, the relay device 200 sets a wireless resource between the relay device 200 and the mobile equipment 100 (S10). For example, the wireless resource management section 221 allocates a wireless resource, generates a control signal including an allocation result, transmits the control signal via the TCP packet processing section 212 and the packet transmission and reception section 211, and thereby, sets a wireless resource.

Next, the server 300 and the mobile equipment 100 set a TCP session (S11). For example, one of the respective two packet transmission and reception sections 310 and 110 of the server 300 and the mobile equipment 100 transmits a TCP session setting request, the other one thereof transmits a response to the request, and thereby, a TCP session is set.

Next, the server 300 and the mobile equipment 100 transmit and receive data (S12). For example, the two packet transmissions and reception sections 110 and 310 insert user data or the like in a TCP packet, transmit the TCP packet, and thereby, exchange data with each other.

The relay device 200 relays data (S12), and then, starts counting of the wireless resource release timer (S13). For example, the wireless resource management section 221 starts counting of the wireless resource release timer.

When the wireless resource release timer expires, the relay device 200 transmits a wireless resource release request to the mobile equipment 100 (S14). For example, when the wireless resource release timer expires, the wireless resource management section 221 generates a wireless resource release request and transmits the generated wireless resource release request to the mobile equipment 100.

Next, when the TCP session release timer expires, the server 300 transmits a TCP session release request (S16). FIG. 5 illustrates an example where, after a wireless resource is released, the TCP session release timer expires.

The relay device 200 receives a TCP session release request and checks whether or not there is a wireless resource (S17). In this case, the relay device 200 releases a wireless resource, and therefore, determines that there is not a wireless resource.

When the relay device 200 determines that there is not a wireless resource, the relay device 200 transmits a TCP session release response to the TCP session release request to the server 300 without transmitting the TCP session release request to the mobile equipment 100 (S18). Thus, for example, the relay device 200 may cause the server 300 to perform TCP session release processing.

When the server 300 receives a TCP session release response, the server 300 performs processing for releasing a TCP session (S11) set between the server 300 and the mobile equipment 100 (S19).

Thereafter, the relay device 200 sets a wireless resource between the relay device 200 and the mobile equipment 100 (S20).

Next, the relay device 200 checks where or not there is an unreleased TCP session (S21). For example, the relay device 200 checks an unreleased TCP session that is a target of a TCP session release request (S16), based on the TCP session DB 223. In this case, the relay device 200 checks a TCP session which has been set (S11) and in which a TCP session release response (S18) has been transmitted to the server 300. In the example of FIG. 5, the unreleased TCP session is a TCP session set in S11.

Next, in order to release an unreleased TCP session, the relay device 200 transmits the received TCP session release request (S16) to the mobile equipment 100 (S22). Thus, the TCP session may be released even at a mobile equipment 100 side.

In this operation example, assuming a case where a wireless resource is not set, when the relay device 200 receives a TCP session release request, the relay device 200 transmits a TCP session release response to the release request to the server 300 without resetting a wireless resource. Thus, for example, in the communication system 10, resetting of a wireless resource for TCP session release is not performed, and the generation of a control signal due to resetting of a wireless resource may be reduced. Therefore, in the communication system 10, the generation of a useless control signal may be reduced.

As for a TCP session release request (S16), when the relay device 200 sets a wireless resource at another opportunity (S20), the relay device 200 transmits a TCP session release request to the mobile equipment 100 using the wireless resource (S22). Thus, for example, the mobile equipment 100 may release a TCP session (S11), and the TCP session release is shared by the mobile equipment 100 and the server 300.

<2. Entire Operation Example where Wireless Resource is Set and there is not any Other TCP Session>

Figure 6:
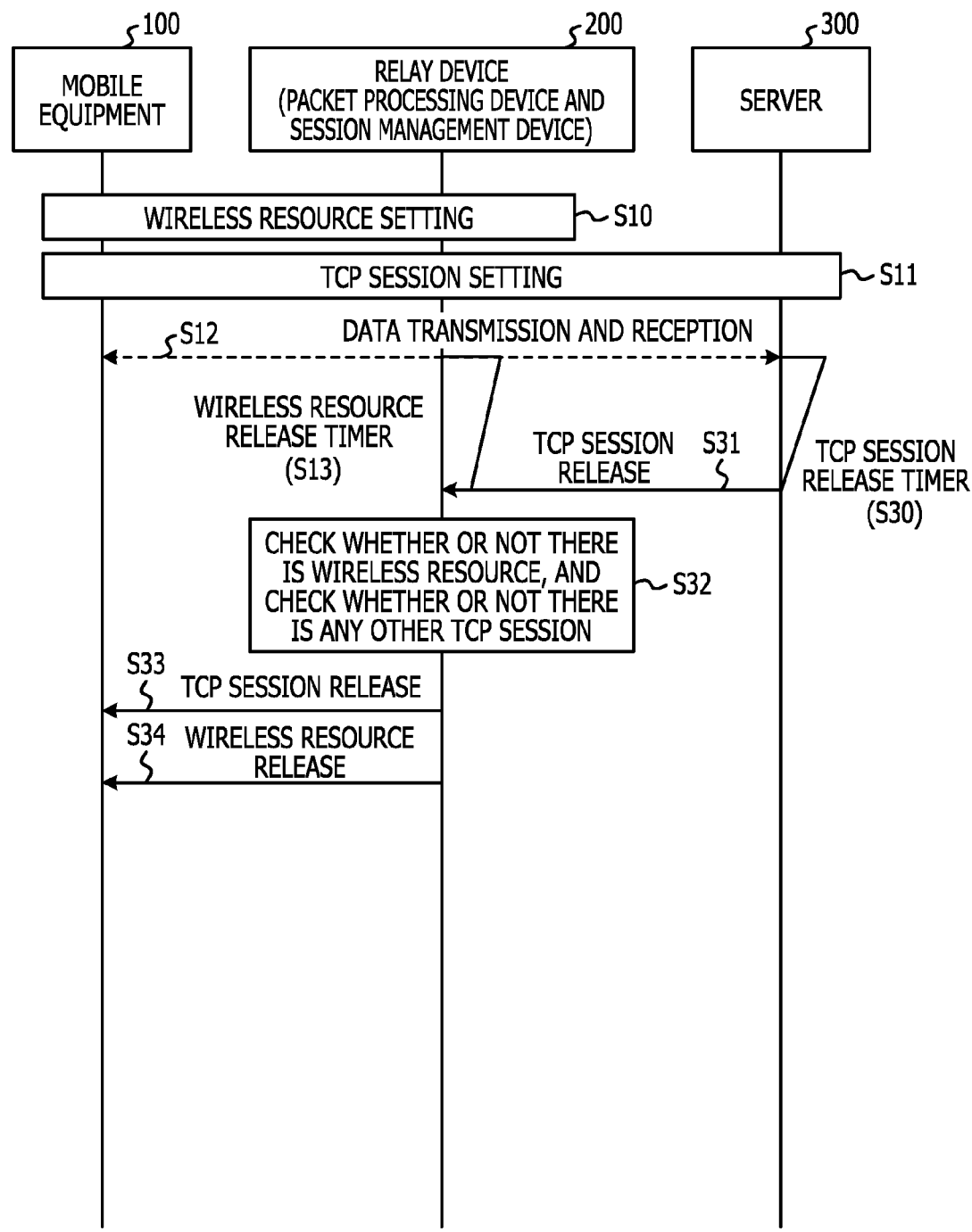
FIG. 6 is a sequence diagram illustrating an entire operation example.

FIG. 6 is a sequence diagram illustrating an entire operation example where a wireless resource is set and there is not any other TCP session.

The relay device 200 sets a wireless resource between the relay device 200 and the mobile equipment 100 (S10), the server 300 and the mobile equipment 100 set a TCP session (S11), and thus, data is transmitted and received (S12).

In the relay device 200, after transmission and reception of data are performed, the wireless resource release timer perform counting, and the TCP session release timer expires before the wireless resource release timer expires. Therefore, the relay device 200 receives a TCP session release request before the wireless resource release timer expires (S31). In this case, the relay device 200 resets the wireless resource release timer, and performs counting from the beginning again. For example, the wireless resource management section 221 receives a report indicating that the TCP session release request has been received from the monitoring section 213, resets the wireless resource release timer that performed counting, and re-starts counting.

Next, the relay device 200 checks whether or not there is a wireless resource and checks whether or not there is any other TCP session (S32). In the example of FIG. 6, there is a wireless resource. As for a TCP session, there is only the TCP session set in S11 and there is not any other TCP session. In this case, the relay device 200 conforms that there is a wireless resource and there is not any other TCP session.

When the relay device 200 confirms that there is a wireless resource and there is not any other TCP session, the relay device 200 transmits the received TCP session release request (S31) to the mobile equipment 100 (S33).

Then, the relay device 200 transmits the wireless resource release request received from the server 300 to the mobile equipment 100 (S33).

Next, even when the wireless resource release timer has not expired, the relay device 200 releases the wireless resource set between the relay device 200 and the mobile equipment 100 (S34).

As described above, in this operation example, in the relay device 200, if a wireless resource is set and there is not any other TCP session, the relay device 200 releases the wireless resource, even before the wireless resource release timer expires (S34). Thus, a wireless resource is released, for example, when a non-communication state continues due to TCP session release (S31), and the wireless resource may be caused to be used for another wireless communication. Therefore, in the communication system 10, the use efficiency of wireless resources may be increased in a non-communication state.

<3. Entire Operation Example>

Figure 7:
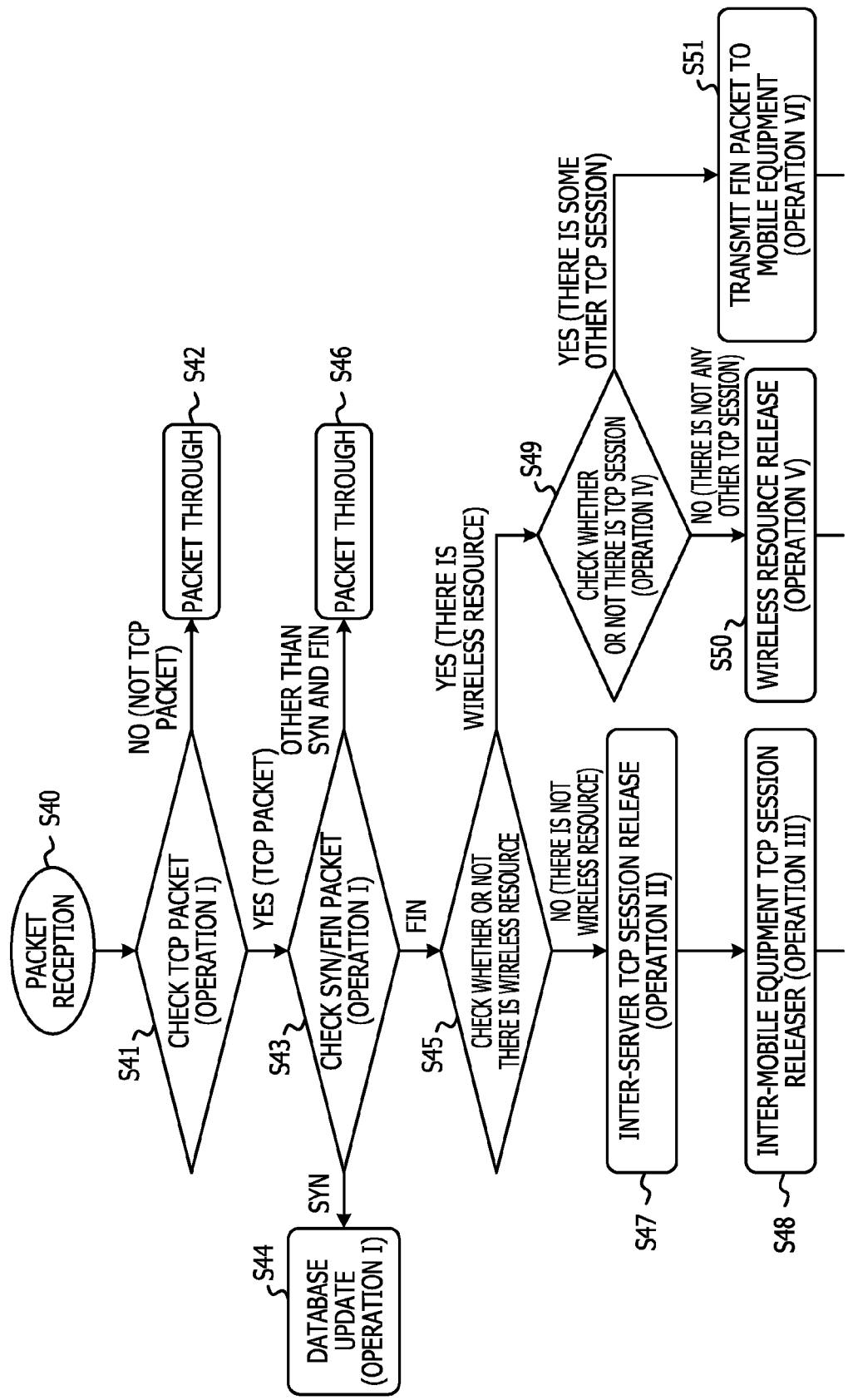
FIG. 7 is a flow chart illustrating an entire operation example.

FIG. 7 is a flow chart illustrating an entire operation example. Although, in the above-described operation example, the two examples have been separately described, in the example of FIG. 7, the two examples are collectively illustrated as one. Note that, in FIG. 7, S40 to S48 correspond to an operation example (for example, FIG. 6) where a wireless resource is not set. Also, S49 and S50 correspond to an operation example (for example, FIG. 7) where a wireless resource is set and there is not any other TCP session. In FIG. 7, an operation example where a wireless resource is set and there is some other TCP session is also included (S51).

When the relay device 200 receives packet data (S40), the relay device 200 checks whether or not the packet data is a TCP packet (S41). In the second embodiment, a connection-type TCP packet is a processing target. For example, the relay device 200 checks whether or not the packet data is a TCP packet, based on a protocol number, for example, "6", of a protocol area included in an IP header of an IP packet that is packet data.

If the received packet data is not a TCP packet (NO in S41), the relay device 200 relays the packet data without performing any particular processing on the received packet data (S42).

On the other hand, if the received packet data is a TCP packet (YES in S41), the relay device 200 checks which one of a TCP packet (which will be hereinafter referred to as a "SIN packet" occasionally) in which a SYN flag area is on, a TCP packet (which will be hereinafter referred to as a "FIN packet" occasionally) in which a FIN flag area is on, and some other TCP packet the received packet data is (S43).

The TCP header includes respective areas of the SYN flag, the FIN flag, and furthermore, an ACK flag. When the SYN flag area is on, for example, it is indicated that the TCP packet is a TCP packet that was transmitted first. When the FIN flag area is on, for example, it is indicated that the TCP packet is a TCP packet that was transmitted last. Furthermore, when an ACK flag area is on, for example, it is indicated that the TCP packet is a TCP packet indicating a confirmation response.

If the TCP packet is a FIN packet, for example, the TCP packet is the last TCP packet, and therefore, may be considered to be a TCP packet indicating a TCP transmission end. If the TCP packet is a FIN packet, a TCP packet is not transmitted thereafter, and therefore, a subsequent packet is considered to be a TCP session release request for releasing a TCP session. That is, in this processing (S43), the relay device 200 checks whether or not the relay device 200 received the TCP session release request, for example, based on whether or not the relay device 200 received the FIN packet.

If the TCP packet is a SYN packet, the TCP packet is a TCP packet that was transmitted first. In this case, in the relay device 200, information regarding the TCP session is stored in the TCP session DB 223, based on the SYN packet. That is, if the received TCP packet is a SYN packet ("SIN" in S43), the relay device 200 performs update (for example, new registration) of the TCP session DB 223 (S44). Details of the update will be described later.

If the received TCP packet is a FIN packet ("FIN" in S43), the relay device 200 performs processing of S45.

If the received TCP packet is neither a SYN packet nor a FIN packet (some other packet than "SYN" and "FIN" in S43), the relay device 200 relays the received TCP packet without performing any particular processing on the received TCP packet (S46).

In S45, the relay device 200 checks whether or not there is a wireless resource (S45). This processing corresponds to, for example, S17 in FIG. 5 and S32 in FIG. 6.

If there is no wireless resource (NO in S45), the relay device 200 releases an inter-server TCP session (S47). This processing corresponds to, for example, S18 and S19 in FIG. 5.

Next, the relay device 200 releases an inter-mobile equipment TCP session (S48). This processing corresponds to, for example, S22 in FIG. 5.

On the other hand, if there is a wireless resource (YES in S45), the relay device 200 checks whether or not there is a TCP session (S49) and, if there is not any other TCP session (NO in S49), the relay device 200 releases the wireless resource (S50). This processing corresponds to, for example, S32 to S34 in FIG. 6.

On the other hand, if there is any other TCP session (YES in S49), the relay device 200 relays the received FIN packet (S51). There are cases where, if there is any other TCP session, transmission and reception of data are performed using the wireless resource. Thus, in the relay device 200, a wireless resource is not immediately released but is used for transmission and reception of data, and the relay device 200 awaits an expiration of the wireless resource release timer and releases the wireless resource.

<Each Operation Example>

Figure 8:
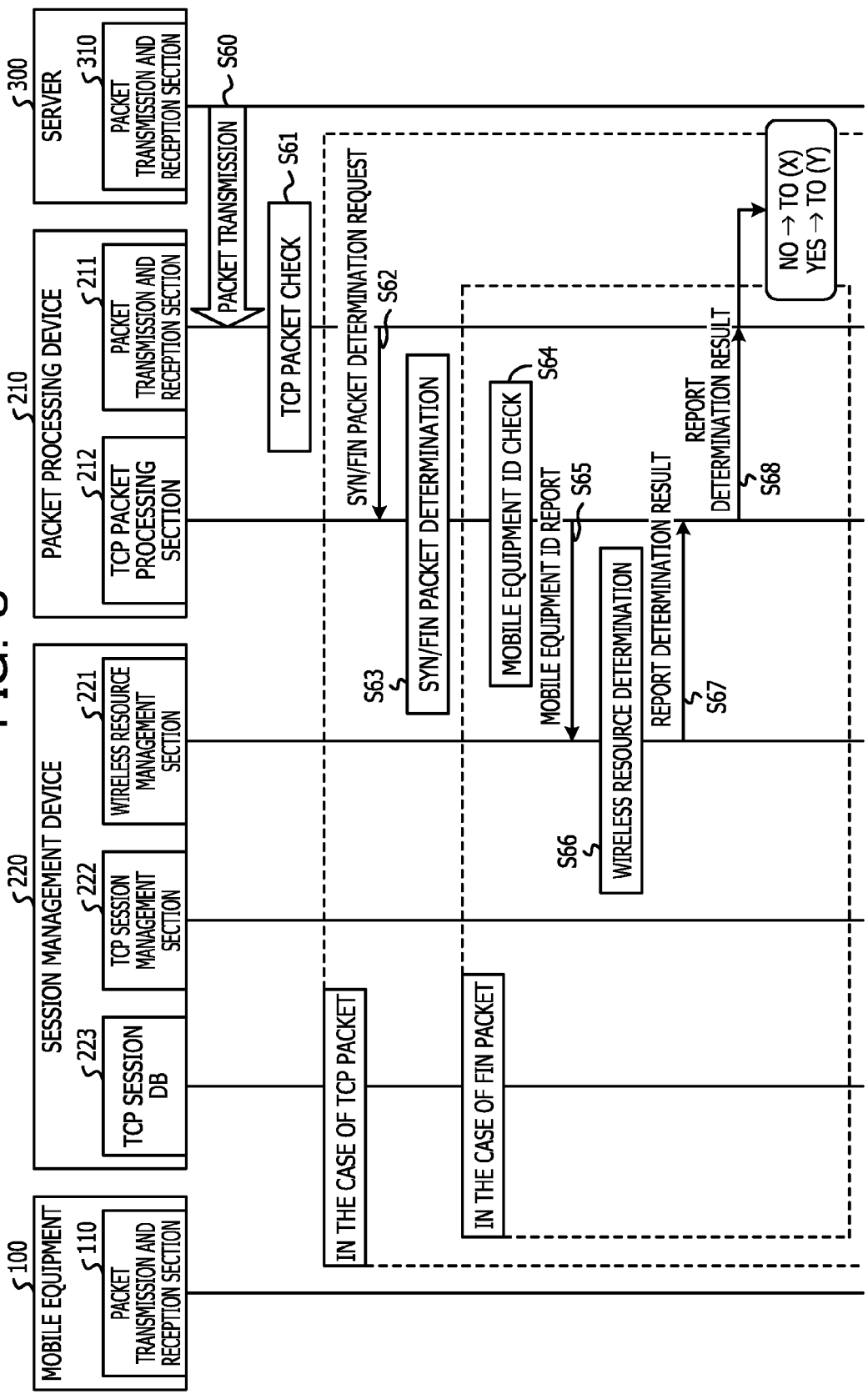
FIG. 8 is a diagram illustrating an example of a wireless resource determination sequence.
Figure 9:
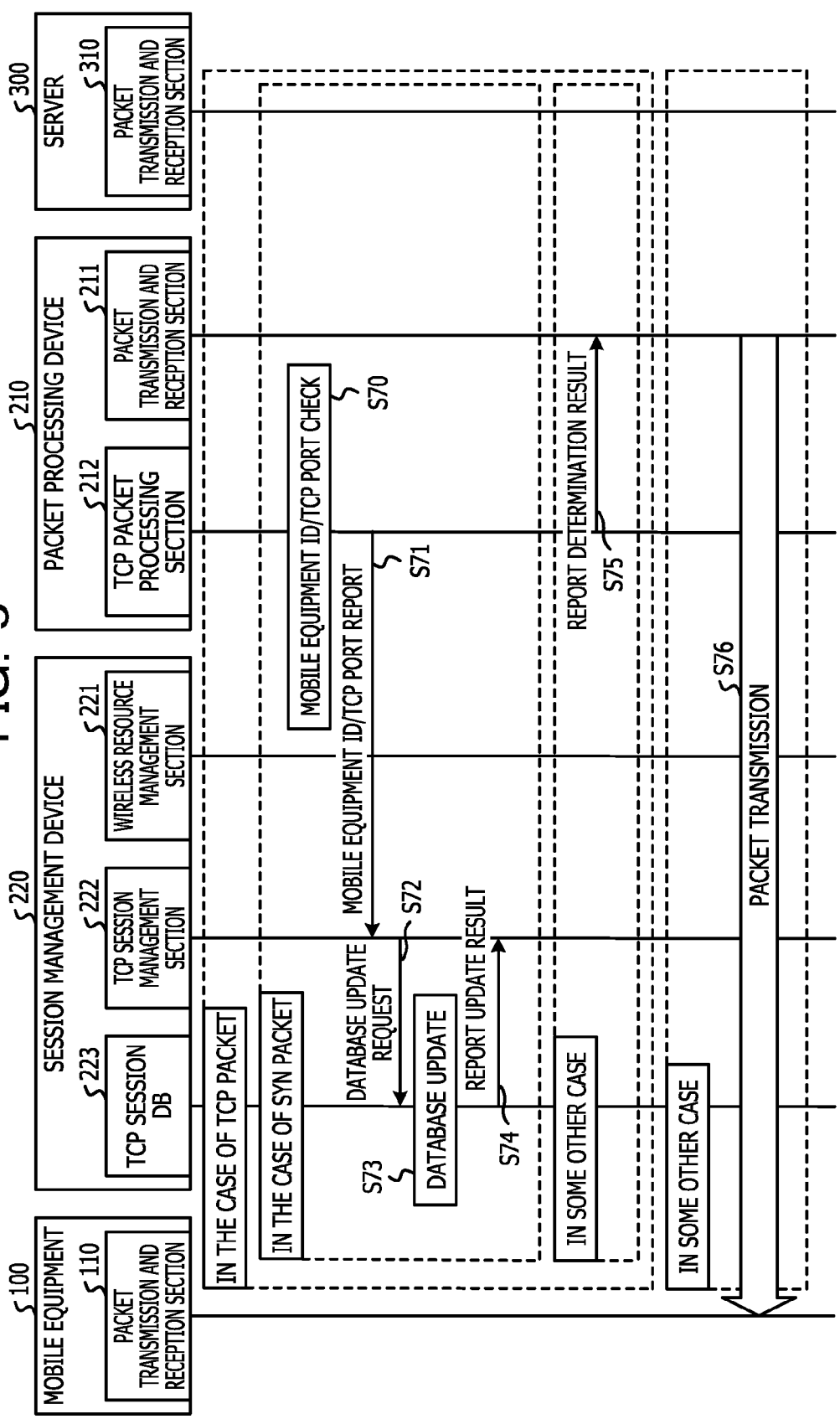
FIG. 9 is a diagram illustrating an example of a wireless resource determination sequence.

Next, each operation example will be described. Details of each operation (S40 to S51) of FIG. 7 will be described. To describe each operation example in a corresponding relationship of FIG. 7, processing from S41 to S45 described as an "operation I" in FIG. 7 will be described first. This processing will be hereinafter referred to as a "wireless resource determination sequence" occasionally. Each of FIG. 8 and FIG. 9 illustrates an example of the "wireless resource determination sequence".

Figure 10:
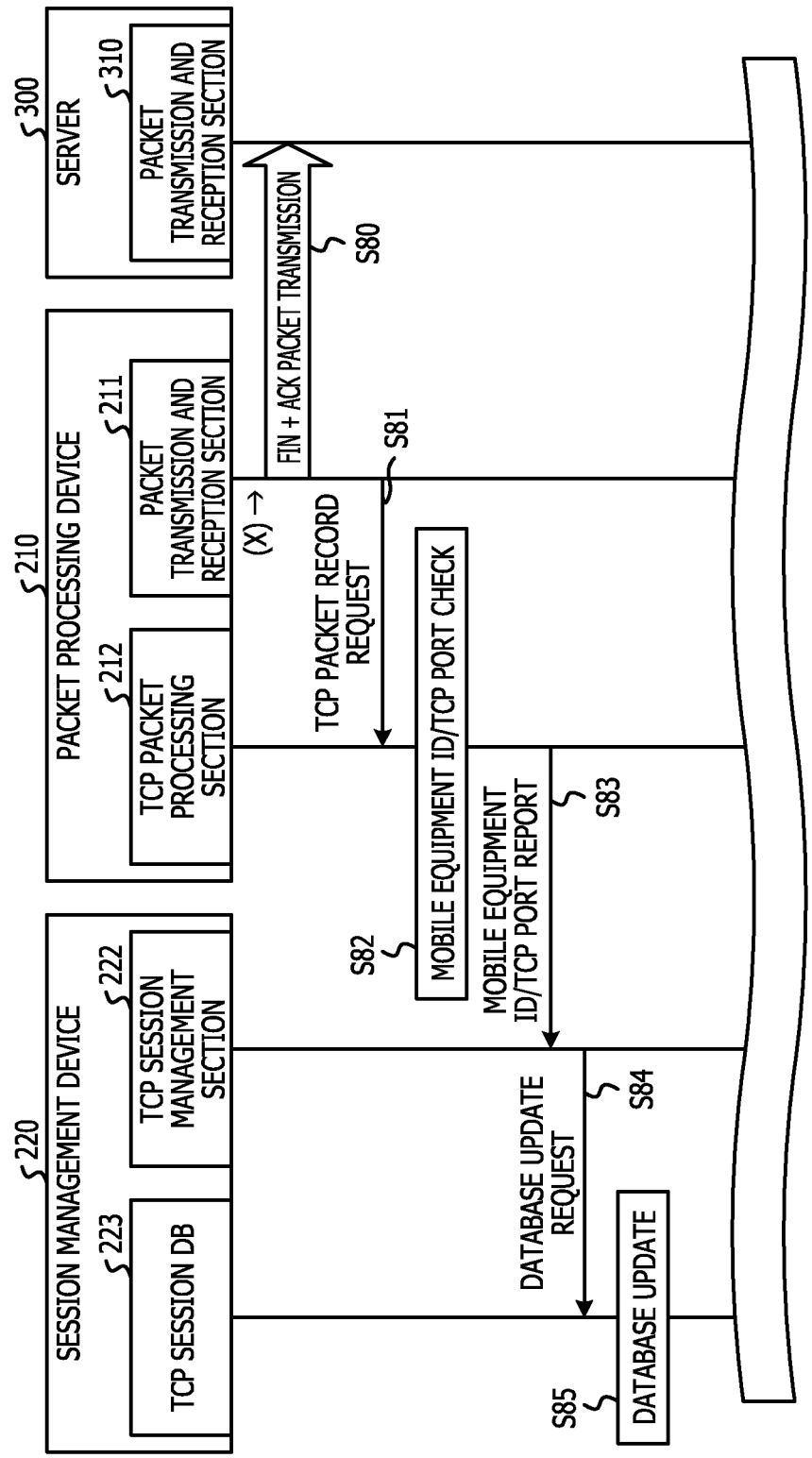
FIG. 10 is a diagram illustrating an example of a TCP session release sequence.

Next, processing of S47 described as an "operation II" in FIG. 7 will be described. This processing will be hereinafter referred to as an "inter-server TCP session release sequence" occasionally. FIG. 10 is a diagram illustrating an example of the "inter-server TCP session release sequence".

Figure 11:
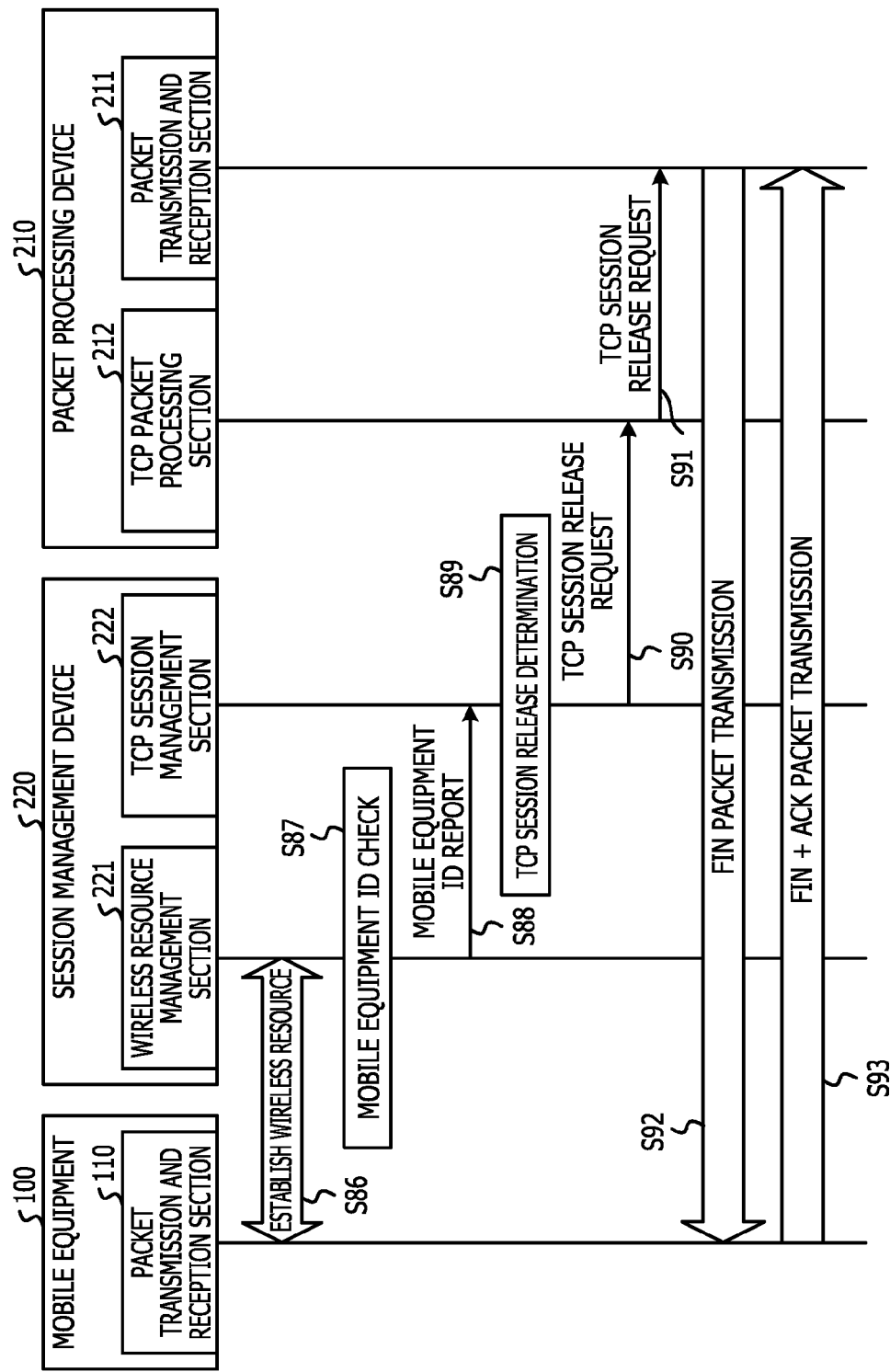
FIG. 11 is a diagram illustrating an example of a TCP session release sequence.

Next, processing of S48 described as an "operation III" in FIG. 7 will be described. This processing will be hereinafter referred to as an "inter-mobile equipment TCP session release sequence" occasionally. FIG. 11 is a diagram illustrating an example of the "inter-mobile equipment TCP session release sequence".

Figure 12:
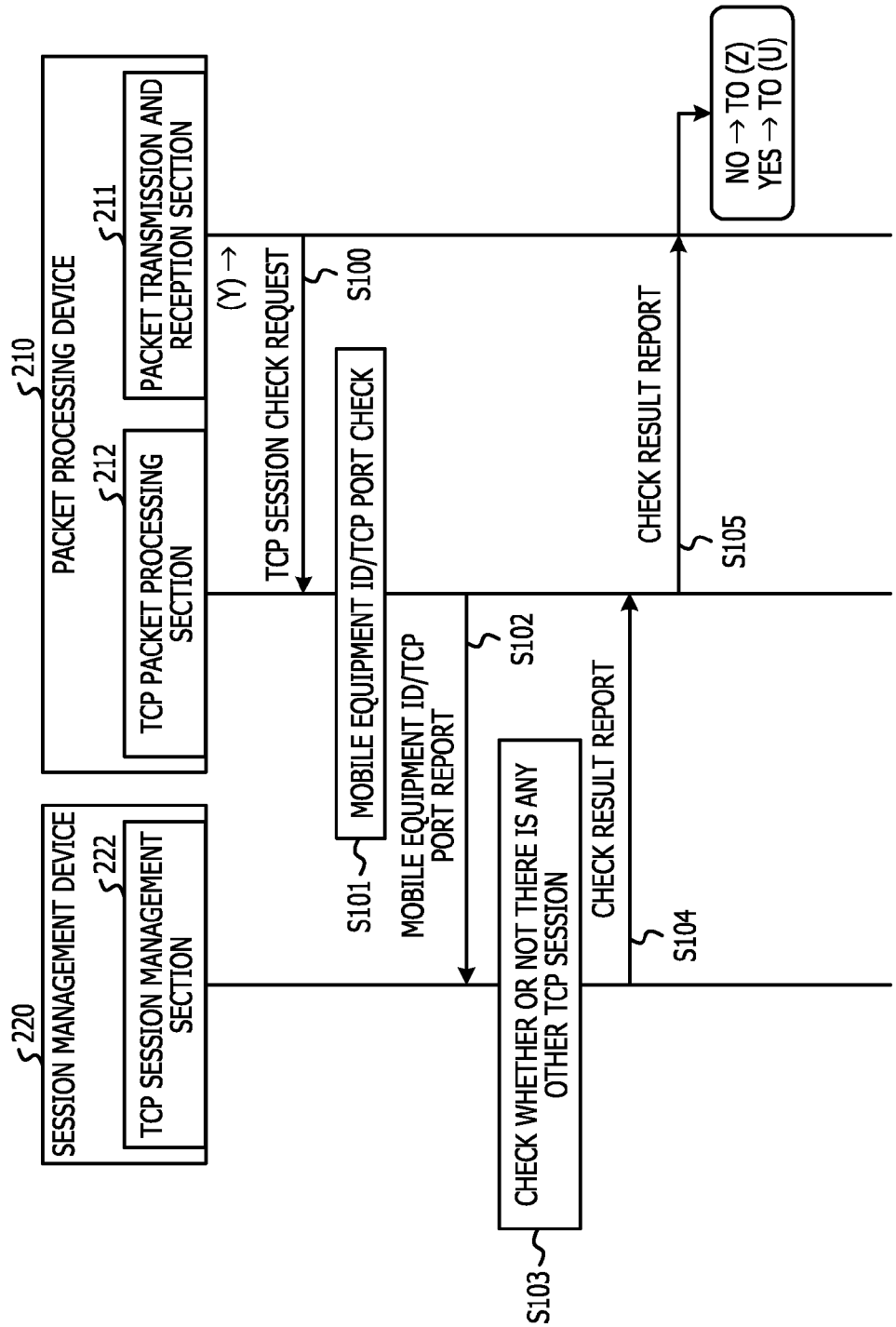
FIG. 12 is a diagram illustrating an example of an any other TCP session checking sequence.

Next, processing of S49 described as an "operation IV" in FIG. 7 will be described. This processing will be hereinafter referred to as an "any other TCP session checking sequence" occasionally. FIG. 12 is a diagram illustrating an example of the "any other TCP session checking sequence".

Figure 13:
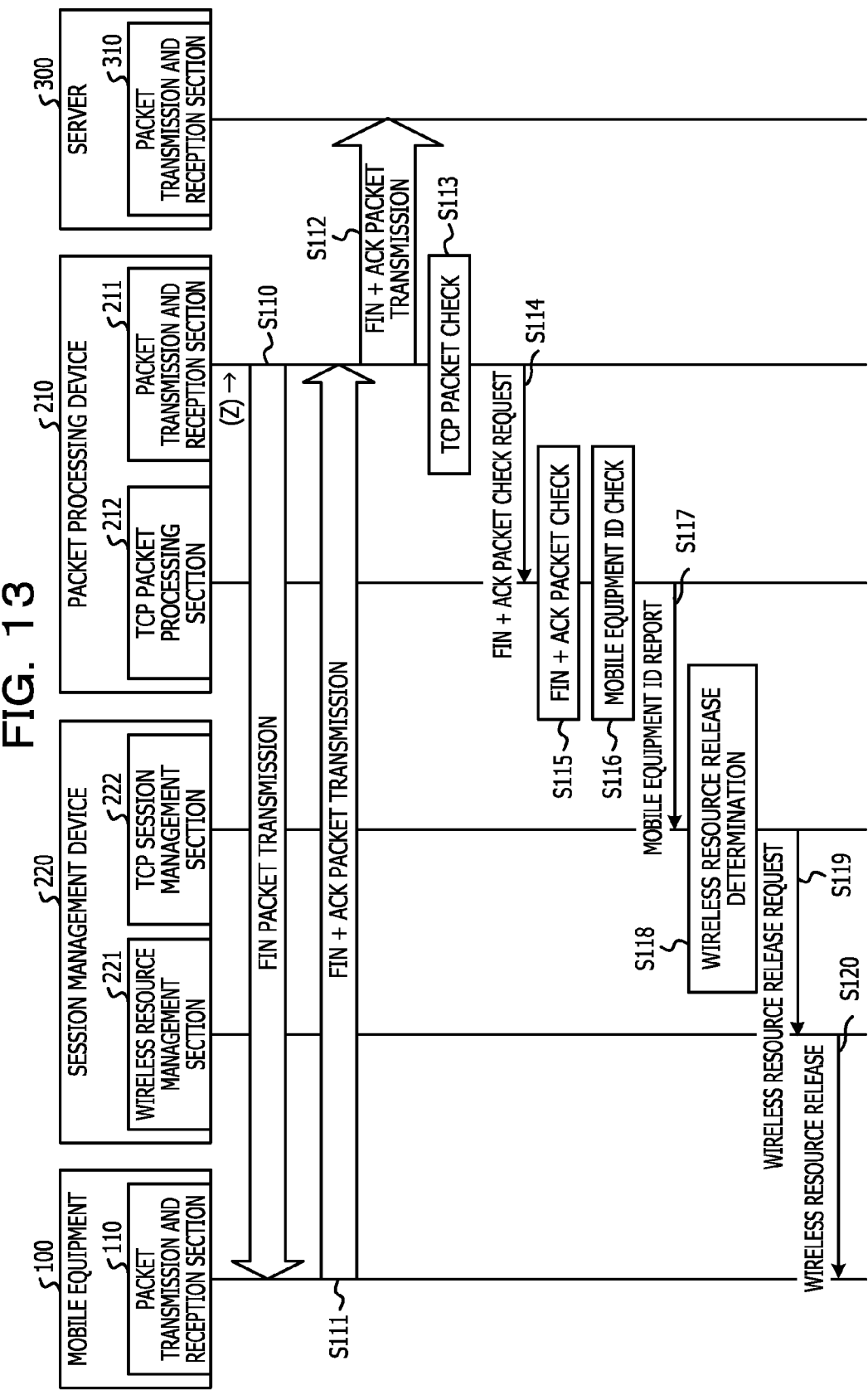
FIG. 13 is a diagram illustrating an example of a wireless resource release sequence.

Next, processing of S50 described as an "operation V" in FIG. 7 will be described. This processing will be hereinafter referred to as a "wireless resource release sequence" occasionally. FIG. 13 is a diagram illustrating an example of the "wireless resource release sequence".

Figure 14:
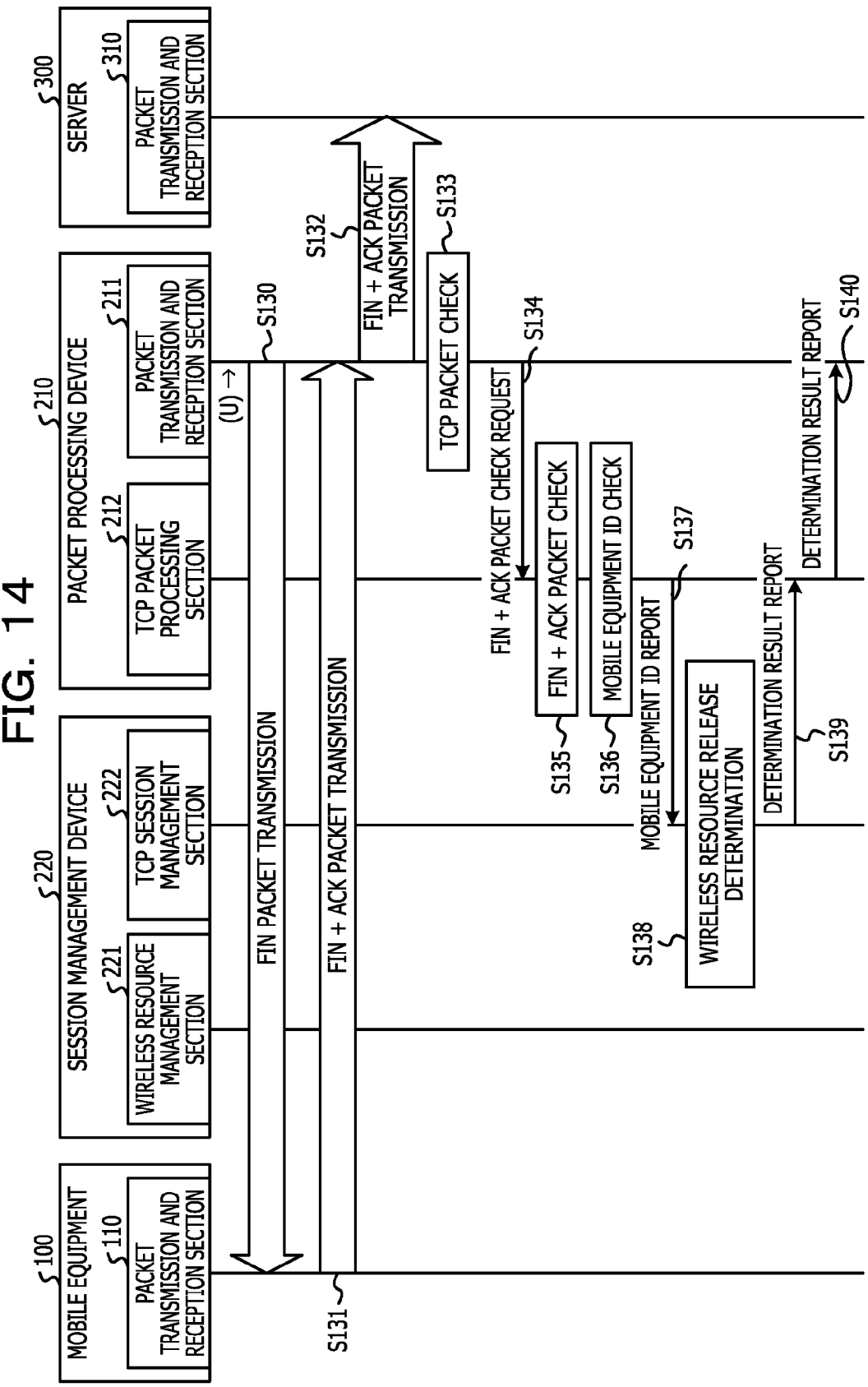
FIG. 14 is a diagram illustrating an example of a FIN packet transfer sequence.

Lastly, processing of S51 described as an "operation VI" in FIG. 7 will be described. This processing will be hereinafter referred to as a "FIN packet transfer sequence" occasionally. FIG. 14 is a diagram illustrating an example of the "FIN packet transfer sequence".

<1. Wireless Resource Determination Sequence>

FIG. 8 and FIG. 9 are diagrams each illustrating an example of a wireless resource determination sequence. Note that the relay device 200 sets a wire resource for the mobile equipment 100, and the mobile equipment 100 and the server (for example, application server) 300 set a TCP session.

When the packet transmission and reception section 211 of the packet processing section 210 receives a packet from the server 300 (S60), the packet transmission and reception section 211 checks whether or not the received packet is a TCP packet (S61).

When the packet transmission and reception section 211 confirms that the received packet is a TCP packet, the packet transmission and reception section 211 performs processing from S62 to S75 in FIG. 9. On the other hand, when the packet transmission and reception section 211 confirms that the received packet is not a TCP packet, the packet transmission and reception section 211 performs processing of S76.

Returning to FIG. 8, when the packet transmission and reception section 211 confirms that the received packet is a TCP packet, the packet transmission and reception section 211 outputs the received TCP packet (or a TCP header) to the TCP packet processing section 212 and requests for determining whether the TCP packet is a SYN packet or a FIN packet (S62).

The TCP packet processing section 212 determines whether the TCP packet is a SYN packet or a FIN packet in accordance with the request (S63).

When the TCP packet processing section 212 confirms that the TCP packet is a SYN packet, the TCP packet processing section 212 checks a mobile equipment ID and a TCP port number (S70 in FIG. 9). For example, the monitoring section 213 of the TCP packet processing section 212 checks the mobile equipment ID and the TCP port number, based on the transmission source port number and transmission port number of a TCP header.

Next, the TCP packet processing section 212 reports the checked mobile equipment ID and TCP port number to the TCP session management section 222 (S71).

Next, the TCP session management section 222 outputs a database update request to the TCP session DB 223 (S72). In this case, the TCP session management section 222 also outputs the reported mobile equipment ID and TCP port number to the TCP session DB 223.

Next, the TCP session management section 222 updates the TCP session DB 223 (S73). In this case, for example, the TCP session management section 222 newly stores a group of the mobile equipment ID and the TCP port number in the TCP session DB 223. For example, as illustrated in FIG. 4, "aa" is stored as the mobile equipment ID and "cc" is stored as the TCP port number in the TCP session DB 223.

Returning to FIG. 9, next, the TCP session DB 223 reports an update result to the TCP session management section 222 (S74).

Returning to FIG. 8, if the received TCP packet is a FIN packet, the TCP packet processing section 212 checks the mobile equipment ID (S64). The TCP packet processing section 212 checks the mobile equipment ID, for example, based on the transmission port number included in the TCP header.

Next, the TCP packet processing section 212 reports the mobile equipment ID to the wireless resource management section 221 (S65).

Next, the wireless resource management section 221 checks whether or not there is a wireless resource, based on the mobile equipment ID (S66). For example, the wireless resource management section 221 manages information regarding whether or not a wireless resource is allocated for each mobile equipment 100 by scheduling, and checks whether or not there is a wireless resource, based on this information.

Next, the wireless resource management section 221 generates a determination result and reports the generated determination result to the TCP packet processing section 212 (S67).

Next, the TCP packet processing section 212 reports the determination result to the packet transmission and reception section 211 (S68).

If the packet transmission and reception section 211 acquires the determination result indicating that there is not a wireless resource, the packet transmission and reception section 211 proceeds to the sequence (the inter-server TCP session release sequence) of FIG. 10. On the other hand, if the packet transmission and reception section 211 acquires the determination result indicating that there is a wireless resource, the packet transmission and reception section 211 proceeds to the sequence (the any other TCP session checking sequence) of FIG. 12.

Returning to FIG. 9, if it is determined by packet determination that the TCP packet is neither a SYN packet nor a FIN packet, the TCP packet processing section 212 reports the determination result to the packet transmission and reception section 211 (S75). In this case, in subsequent processing, the packet transmission and reception section 211 and the relay device 200 relay the received TCP packet (S60).

On the other hand, if the packet transmission and reception section 211 confirms that the received packet is not a TCP packet (S61 in FIG. 8), the packet transmission and reception section 310 relays the received packet (S60 in FIG. 8) (S76 in FIG. 9).

<2. Inter-Server TCP Session Release Sequence>

FIG. 10 is a diagram illustrating an example of an inter-server TCP session release sequence. This sequence is a sequence example where, in a wireless determination sequence (for example, FIG. 8), the relay device 200 that receives a FIN packet and determines that there is not a wireless resource releases a TCP session between the relay device 200 and the server 300.

When the packet transmission and reception section 211 receives a determination result indicating that there is not a wireless resource from the TCP packet processing section 212 (S68 in FIG. 8), the packet transmission and reception section 211 transmits a FIN+ACK packet to the server 300 (S80). The FIN+ACK packet is a response (a message) to the TCP session release request received by the relay device 200, and is a response packet for the FIN packet.

As described above, when the relay device 200 receives a FIN packet (S60 in FIG. 8), the relay device 200 transmits the FIN+ACK packet to the server 300 without transmitting the FIN packet to the mobile equipment 100.

Note that the TCP header includes a FIN flag area and an ACK flag area. The FIN+ACK packet is, for example, a TCP packet in which each of respective flags of the two areas is on or "1". Therefore, when the packet transmission and reception section 211 receives a determination result indicating that there is not a wireless resource, the packet transmission and reception section 211 generates a TCP packet including a TCP header in which each of the two areas is set "1" and transmits the TCP packet to the server 300.

Next, the packet transmission and reception section 211 outputs a record request for the TCP packet to the TCP packet processing section 212 (S81).

The TCP packet processing section 212 receives the record request, checks the mobile equipment ID and TCP port number of the received FIN packet (S82), and reports the mobile equipment ID and the TCP port number to the TCP session management section 222 (S83). For example, the TCP packet processing section 212 checks the mobile equipment ID and the TCP port number, based on the transmission source port number and the transmission destination port number included in the TCP header of the received FIN packet (S60 in FIG. 8).

Next, the TCP session management section 222 requests update of the TCP session DB 223 (S84). In this case, the TCP session management section 222 outputs the mobile equipment ID and the TCP port number to the TCP session DB 223 and updates the TCP session DB 223 (S85).

In this case, the TCP session management section 222 updates "flag information" corresponding to the group of the mobile equipment ID and the TCP port number to "1 (or on)" in the TCP session DB 223. In the example of FIG. 4, for the mobile equipment ID "aa" and the TCP port number "bb", the "flag information" is 1.

The "flag information" is, for example, information indicating in which TCP session a TCP session release response was transmitted to the server 300 without transmitting a TCP session release request to the mobile equipment 100.

After this processing, when a wireless resource is set at an opportunity, the relay device 200 determines a TCP session (a TCP session that is a release target in accordance with the FIN+ACK packet) that is to be released (S89 and the like of FIG. 11, which will be described later). The relay device 200 determines, as a TCP session that is to be released, the group of the mobile equipment ID and the TCP port number for which the "flag information" is "1", and then, transmits a TCP session release request, that is, for example, a FIN packet to the mobile equipment ID (S90 in FIG. 11 and subsequent steps, which will be described later).

<3. Inter-Mobile Equipment TCP Session Release Sequence>

FIG. 11 is a diagram illustrating an example of an inter-mobile equipment TCP session release sequence. A sequence example of FIG. 11 is performed, for example, when, after the inter-server TCP session release sequence illustrated in FIG. 10 is performed, a wireless resource is set for the mobile equipment 100 at an opportunity (S86), The wireless resource management section 221 allocates a wireless resource to the mobile equipment 100, transmits a control signal, and thereby establishes a wireless resource (S86).

Next, the wireless resource management section 221 checks the mobile equipment ID (S87). For example, the wireless resource management section 221 may perform checking based on the mobile equipment ID used in allocating a wireless resource (S86). As another alternative, as described above, the wireless resource management section 221 may hold information indicating which wireless resource was allocated to which mobile equipment (S86) and check the mobile equipment ID, based on the information.

Next, the wireless resource management section 221 reports the mobile equipment ID to the TCP session management section 222 (S88).

When the TCP session management section 222 receives a report of the mobile equipment ID, the TCP session management section 222 performs TCP session release determination (S89). For example, the TCP session management section 222 checks the mobile equipment ID for which the "flag information" in the TCP session DB 223 is "1".

Next, the TCP session management section 222 reports the TCP session release request to the TCP packet processing section 212 (S90). For example, the TCP session management section 222 also reports the mobile equipment ID checked in TCP session release determination to the TCP packet processing section 212.

Next, the TCP packet processing section 212 reports the TCP session release request to the packet transmission and reception section 211 (S91). For example, the TCP packet processing section 212 reports the mobile equipment ID received from the TCP session management section 222 to the packet transmission and reception section 211.

Next, the packet transmission and reception section 211 transmits the FIN packet to the mobile equipment 100 in accordance with the TCP session release request (S92). For example, the packet transmission and reception section 211 is reported the mobile equipment ID as well, and therefore, the packet transmission and reception section 211 transmits the FIN packet to the mobile equipment 100 having the mobile equipment ID. The relay device 200 transmits the FIN packet to the mobile equipment 100, and thus, for example, the packet release request is transmitted to the mobile equipment 100.

Next, the mobile equipment 100 generates, as a response packet for a FIN packet, a FIN+ACK packet, and transmits the generated FIN+ACK packet to the server 300 (S93). When the relay device 200 receives the FIN+ACK packet from the mobile equipment 100, the relay device 200 terminates the TCP packet. The relay device 200 has already transmitted the FIN+ACK packet (S80 in FIG. 10 and the like), and therefore, has terminated the received FIN+ACK packet. For example, The terminating section 214 of the TCP packet processing section 212 confirms, based on the TCP header, that the TCP packet received from the packet transmission and reception section 211 is the FIN+ACK packet addressed to the server 300, and terminates the TCP packet.

<4. Any Other TCP Session Checking Sequence>

FIG. 12 is a diagram illustrating an example of an any other TCP session checking sequence. This sequence is a sequence performed, for example, when the relay device 200 receives a FIN packet from the server 300 and a wireless resource is set at reception of the FIN packet (S68 in FIG. 8).

When the packet transmission and reception section 211 receives a determination result indicating that there is a wireless resource (S68 in FIG. 8), the packet transmission and reception section 211 reports a TCP session checking request to the TCP packet processing section 212 (S100).

Next, the TCP packet processing section 212 checks the mobile equipment ID and TCP port number of the received FIN packet (S60 in FIG. 8) (S101). This processing is similar to, for example, the processing of S82 in FIG. 10.

Next, the TCP packet processing section 212 reports the checked mobile equipment ID and TCP port number to the TCP session management section 222 (S102).

Next, the TCP session management section 222 checks, based on the received mobile equipment ID and TCP port number, whether or not there is any other TCP session (S103). In the second embodiment, if, when the relay device 200 receives the FIN packet, a wireless resource is set, the relay device 200 confirms that there is not any other TCP session and releases a TCP session that is a FIN packet target. In this processing, whether or not there is any other TCP session is checked.

As a checking method, for example, the TCP session management section 222 accesses the TCP session DB 223 and checking is performed, based on the received mobile equipment ID (S102). That is, if there is only one mobile equipment ID that is the same as the received mobile equipment ID in the TCP session DB 223, the TCP session management section 222 determines that "there is not any other TCP session". On the other hand, if there is a plurality of mobile equipment IDs that is the same as the received mobile equipment ID in the TCP session DB 223, the TCP session management section 222 determines that "there is some other TCP session".

Next, the TCP session management section 222 reports a checking result of checking on whether or not there is any other TCP session to the TCP packet processing section 212 (S104).

Next, the TCP packet processing section 212 reports the checking result to the packet transmission and reception section 211 (S105).

If there is not any other TCP session, the packet transmission and reception section 211 proceeds to a sequence (a wireless resource release sequence) of FIG. 13. If there is any other TCP session, the packet transmission and reception section 211 proceeds to a sequence (a FIN packet transfer sequence) of FIG. 14.

<5. Wireless Resource Release Sequence>

FIG. 13 is a diagram illustrating an example of a wireless resource release sequence. If the packet transmission and reception section 211 receives a FIN packet, a wireless resource is set at the reception of the FIN packet, and there is not any other TCP session, the packet transmission and reception section 211 transmits the FIN packet to the mobile equipment 100 (S110). The relay device 200 transmits the FIN packet to the mobile equipment 100, and thereby, for example, a TCP session release request is transmitted to the mobile equipment 100.

Next, the mobile equipment 100 transmits a response packet ("a FIN+ACK packet") for the FIN packet to the server 300 (S111). The relay device 200 relays the FIN+ACK packet (S112).

Next, the packet transmission and reception section 211 checks whether or not the relayed packet is a TCP packet (S113), and reports a FIN+ACK packet checking request to the TCP packet processing section 212 (S114). For example, the packet transmission and reception section 211 checks, based on the IP header of the relayed packet, whether or not the packet is a TCP packet. The packet transmission and reception section 211 reports, for example, the received TCP packet (or a TCP header) to the TCP packet processing section 212.

Next, the TCP packet processing section 212 checks whether or not the relayed TCP packet is a FIN+ACK packet addressed to the server 300 from the mobile equipment 100 (S115). The TCP packet processing section 212 performs checking, for example, based on whether or not each of two areas, that is, a FIN area and an ACK area of the TCP header is on.

Next, the TCP packet processing section 212 checks the mobile equipment ID (S116). Similar to S64 in FIG. 8, for example, the TCP packet processing section 212 checks the mobile equipment ID, based on a transmission destination port number included in the TCP header.

Next, the TCP packet processing section 212 reports the checked mobile equipment ID to the TCP session management section 222 (S117).

Next, the TCP session management section 222 performs a wireless resource release determination, based on the mobile equipment ID (S118).

Before this processing, it was already confirmed that there is not any other TCP session (S102 in FIG. 12). Therefore, when this processing is performed, for example, one TCP port number is stored for one mobile equipment ID in the TCP session DB 223 illustrated in FIG. 4. Accordingly, the TCP session management section 222 determines whether or not a wireless resource is to be released, based on whether or not one TCP port number is stored for the reported mobile equipment ID in the TCP session DB 223. In this case, since there is not any other TCP session, only one TCP port number is stored for one mobile equipment ID in the TCP session DB 223, and thus, the TCP session management section 222 determines to release the wireless resource.

The TCP session management section 222 that determined to release a wireless resource removes the same mobile equipment ID as the received mobile equipment ID (S117) from the TCP session DB 223. Thus, the relay device 200 may confirm that there is no longer a TCP session.

Note that, when a plurality of groups of the mobile equipment ID and the TCP port number is stored in the TCP session DB 223, there is some other TCP session, and therefore, the TCP session management section 222 determines not to release the wireless resource (S138 in FIG. 14, which will be described later).

Returning to FIG. 13, the TCP session management section 222 reports a wireless resource release request for the mobile equipment ID removed from the TCP session DB 223 to the wireless resource management section 221 (S119).

Next, the wireless resource management section 221 performs processing regarding wireless resource release on the mobile equipment 100 (S120). For example, the wireless resource management section 221 receives the mobile equipment ID from the TCP session management section 222 (S119), generates a control signal indicating that the wireless resource is to be released for the mobile equipment ID, and transmits the control signal to the mobile equipment 100.

<6. FIN Packet Transfer Sequence>

FIG. 14 is a diagram illustrating an example of a FIN packet transfer sequence. Processing from S130 to S138 in FIG. 14 is the same as the processing of the wireless resource release sequence example illustrated in FIG. 13.

In S138, the TCP session management section 222 performs wireless resource release determination and, in this case, a plurality of groups of the mobile equipment ID and the TCP port number is stored in the TCP session DB 223. Therefore, the TCP session management section 222 determines not to release the wireless resource.

Next, the TCP session management section 222 reports the determination result to the TCP packet processing section 212 (S139), and the TCP packet processing section 212 reports the determination result to the packet transmission and reception section 211 (S140). In this case, the wireless resource is not released and is still maintained.

OTHER EMBODIMENTS

Next, other embodiments will be described.

Figure 15:
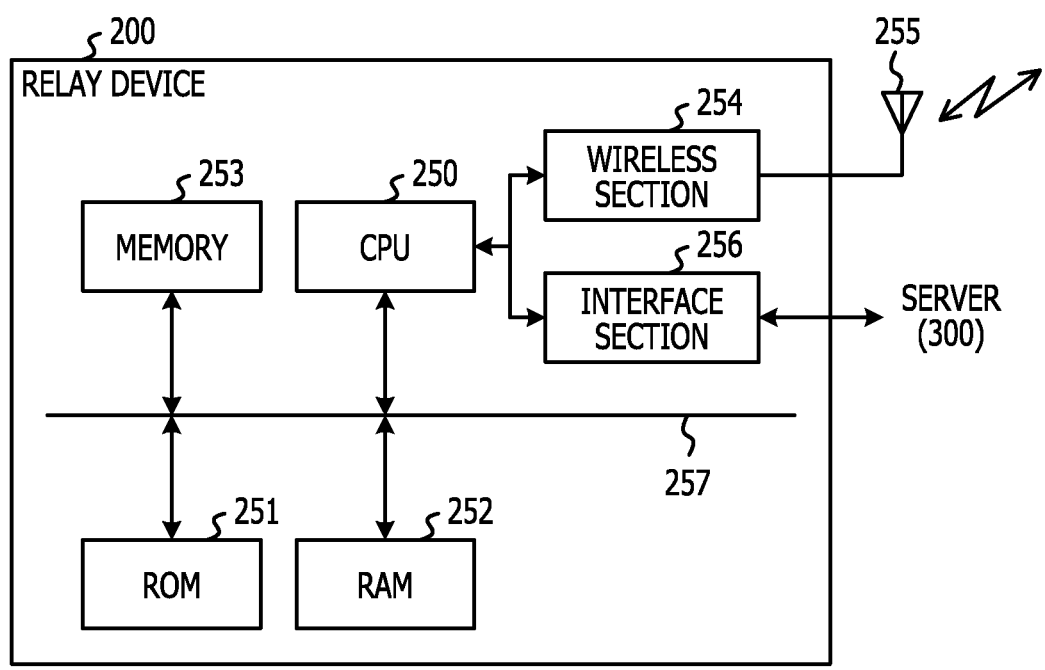
FIG. 15 is a diagram illustrating a configuration example of a relay device.

FIG. 15 is a diagram illustrating a hardware configuration example of a relay device 100. The relay device 100 includes a central processing unit (CPU) 250, a read only memory (ROM) 251, a random access memory (RAM) 252, a memory 253, a wireless section 254, an antenna 255, an interface section 256, and a bus 257.

The CPU 250 reads out a program stored in the ROM 251, loads the readout program to the RAM 252, executes the loaded program, and thereby realizes functions of the TCP packet processing section 212 and the session management device 220. The CPU 250 corresponds to, for example, the TCP packet processing section 212 and the session management device 220 in the second embodiment.

The wireless section 254 receives a TCP packet and the like from the CPU 250, converts the TCP packet to a radio signal, and outputs the radio signal to the antenna 255. Also, the wireless section 254 extracts a TCP packet and the like from the radio signal output from the antenna 255 and outputs the TCP packet and the like to the CPU 250. The wireless section 254 corresponds to, for example, the packet transmission and reception section 211 in the second embodiment.

The interface section 256 exchanges a TCP packet and the like with the server 300. The interface section 256 corresponds to, for example, the packet transmission and reception section 211 in the second embodiment.

The memory 253 includes, for example, a TCP session DB 223. The memory 253 corresponds to the TCP session DB 223 in the second embodiment.

Note that FIG. 15 illustrates an example where the relay device 100 is a base station. When the relay device 100 is a higher-level device, such as an RNC, an MME, and the like, the wireless section 254 and the antenna 255 of FIG. 15 are not provided, and packet data is exchanged with another device or the server 300 via the interface section 256.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device configured to relay packet data between an information processing device and a mobile equipment, the mobile equipment being configured to be coupled to the relay device via a wireless resource, the information processing device and the mobile equipment being configured to set a communication session therebetween, the relay device comprising:
   a memory; and
   a processor coupled to the memory and configured to:
   receive, from the information processing device, a session release request that requests release of the communication session set between the mobile equipment and the information processing device,
   transmit a session release response to the session release request to the information processing device without transmitting the session release request to the mobile equipment when the wireless resource is not allocated to the mobile equipment, wherein the information processing device releases the session based on the session release response, and
   after the session release response is transmitted to the information processing device, transmit the session release request to the mobile equipment when the wireless resource is allocated to the mobile equipment, wherein the mobile equipment releases the session based on the session release request.

2. The relay device according to claim 1, wherein the processor is configured to
   when the wireless resource is allocated to the mobile equipment, transmit the session release request to the mobile equipment, and
   release the wireless resource allocated to the mobile equipment.

3. The relay device according to claim 2, wherein the processor is configured to
   when the wireless resource is allocated to the mobile equipment and any other communication session than the communication session that is a target of the session release request is not set, transmit the session release request to the mobile equipment, and
   release the wireless resource allocated to the mobile equipment.

4. The relay device according to claim 2, wherein the processor is configured to release the wireless resource before a wireless resource release timer counts time to release of the wireless resource.

5. The relay device according to claim 1, wherein the processor is configured to
   when a plurality of the communications sessions is set between the mobile equipment and the information processing device, hold flag information indicating which one of the plurality of communication sessions the session release request targets,
   transmit, based on the flag information, the session release request to the mobile equipment, and
   release the wireless resource allocated to the mobile equipment.

6. The relay device according to claim 5, wherein the processor is configured to turn on the flag information after the processor transmits the session release response.

7. The relay device according to claim 1, wherein the communication session is a connection-type communication session for transmitting a response to a request.

8. The relay device according to claim 1, wherein the communication session is a communication session in accordance with a transmission control protocol.

9. The relay device according to claim 8, wherein the session release request is transmission control protocol packet data in which a FIN flag of a transmission control protocol header included in the transmission control protocol packet data is on, and
   the session release response is a transmission control protocol packet data in which a FIN flag and an ACK flag of a transmission control protocol header included in the transmission control protocol packet data is on.

10. A session control method using a relay device configured to relay packet data between an information processing device and a mobile equipment, the mobile equipment being configured to be coupled to the relay device via a wireless resource, the information processing device and the mobile equipment being configured to set a communication session therebetween, the method comprising:
    receiving a session release request that requests release of the communication session set between the mobile equipment and the information processing device from the information processing device;
    transmitting a session release response to the session release request to the information processing device without transmitting the session release request to the mobile equipment when the wireless resource is not allocated to the mobile equipment, wherein the information processing device releases the session based on the session release response; and
    after the session release response is transmitted to the information processing device, transmitting the session release request to the mobile equipment when the wireless resource is allocated to the mobile equipment, wherein the mobile equipment releases the session based on the session release request.

11. The method according to claim 10, further comprising:
when the wireless resource is allocated to the mobile equipment, transmitting the session release request to the mobile equipment; and
releasing the wireless resource allocated to the mobile equipment.

12. The method according to claim 11, further comprising:
when the wireless resource is allocated to the mobile equipment and any other communication session than the communication session that is a target of the session release request is not set, transmitting the session release request to the mobile equipment; and
releasing the wireless resource allocated to the mobile equipment.

13. The method according to claim 11, wherein
the wireless resource is released before a wireless resource release timer counts time to release of the wireless resource.

14. The method according to claim 10, further comprising:
when a plurality of the communications sessions is set between the mobile equipment and the information processing device, holding flag information indicating which one of the plurality of communication sessions the session release request targets;
transmitting, based on the flag information, the session release request to the mobile equipment; and
releasing the wireless resource allocated to the mobile equipment.

15. The method according to claim 14, further comprising:
turning on the flag information after transmitting the session release response.

16. The method according to claim 10, wherein
the communication session is a connection-type communication session for transmitting a response to a request.

17. The method according to claim 10, wherein
the communication session is a communication session in accordance with a transmission control protocol.

18. The method according to claim 17, wherein
the session release request is transmission control protocol packet data in which a FIN flag of a transmission control protocol header included in the transmission control protocol packet data is on, and
the session release response is a transmission control protocol packet data in which a FIN flag and an ACK flag of a transmission control protocol header included in the transmission control protocol packet data is on.

* * * * *